(12) United States Patent
Baskaran et al.

(10) Patent No.: US 12,719,874 B2
(45) Date of Patent: Aug. 25, 2026

(54) SECURITY MANAGEMENT OF TRUSTED NETWORK FUNCTIONS

(71) Applicant: Lenovo (Singapore) Pte. Limited, Singapore (SG)

(72) Inventors: Sheeba Backia Mary Baskaran, Friedrichsdorf (DE); Andreas Kunz, Ladenburg (DE)

(73) Assignee: Lenovo (Singapore) Pte. Limited, Singapore (SG)

( * ) Notice: Subject to any disclaimer, the term of this patent is extended or adjusted under 35 U.S.C. 154(b) by 60 days.

(21) Appl. No.: 18/874,724

(22) PCT Filed: Jun. 13, 2023

(86) PCT No.: PCT/IB2023/056104
§ 371 (c)(1),
(2) Date: Dec. 13, 2024

(87) PCT Pub. No.: WO2023/242743
PCT Pub. Date: Dec. 21, 2023

(65) Prior Publication Data

US 2025/0379868 A1 Dec. 11, 2025

Related U.S. Application Data

(60) Provisional application No. 63/353,203, filed on Jun. 17, 2022.

(51) Int. Cl.
*H04L 9/40* (2022.01)

(52) U.S. Cl.
CPC ............ *H04L 63/101* (2013.01); *H04L 63/20* (2013.01)

(58) Field of Classification Search
CPC . G06F 21/577; H04L 63/101; H04L 63/1425; H04L 63/1433; H04L 63/20;
(Continued)

(56) References Cited

U.S. PATENT DOCUMENTS 11,509,476 B2 * 11/2022 Choyi .................. H04L 67/563
11,818,102 B2 * 11/2023 Khare ................ H04W 12/009
(Continued)

FOREIGN PATENT DOCUMENTS

CN 111416827 A 7/2020
WO 2023242743 A1 12/2023

OTHER PUBLICATIONS

"Rel. 18 Discussion for Study on Zero Trust Security (ZTS)", 3GPP Draft, S3-220975; 3GPP TSG-SA3 Meeting #107-e; e-meeting, May 16-20, 2022, 6 pages.
(Continued)

*Primary Examiner* — Samson B Lemma
(74) *Attorney, Agent, or Firm* — FIG. 1 Patents

(57) ABSTRACT

Various aspects of the present disclosure relate to a network repository function (NRF) that receives a first signaling as a network function (NF) request from a NF, the NF request including a NF type, a NF identifier (ID), and NF security state information. The NRF verifies a NF security state based on the NF ID and the NF security state information. The NRF transmits a second signaling as a NF response, where the NF response includes a security verification of the NF request.

20 Claims, 12 Drawing Sheets

(58) Field of Classification Search
CPC ............. H04W 12/009; H04W 12/084; H04W 12/122; H04W 12/66; H04W 12/71
USPC .............................................................. 726/4
See application file for complete search history.

(56) References Cited

U.S. PATENT DOCUMENTS

| | | | | |
|---|---|---|---|---|
| 11,902,445 | B2 * | 2/2024 | Choyi | H04L 9/3213 |
| 2021/0250172 | A1 * | 8/2021 | Choyi | H04L 9/3239 |
| 2022/0337558 | A1 * | 10/2022 | Khare | H04L 63/0281 |
| 2023/0106940 | A1 * | 4/2023 | Choyi | H04L 9/3239<br>713/159 |
| 2023/0362199 | A1 * | 11/2023 | Adam | H04L 63/102 |
| 2024/0163271 | A1 * | 5/2024 | Krishan | H04L 9/3213 |

OTHER PUBLICATIONS

Baskaran, et al., "NF State related data collection for Security Monitoring", 3GPP TSG-SA3 Meeting #110 Adhoc-e Electronic Meeting, Apr. 17-21, 2023, 3 pages.
"International Seach Report and Written Opinion", PCT Application No. PCT/IB2023/056104, Nov. 15, 2023, 20 pages.
"Invitation to Pay Additional Fees", PCT Application No. PCT/IB2023/056104, Sep. 25, 2023, 15 pages.
Rose, et al., "Zero Trust Architecture", NIST Special Publication 800-207, Aug. 11, 2020, 59 pages.
Soveri, et al., "Solution to KI#1", Lenovo, Charter Communications, US National Security Agency, 3GPP TSG-SA3 Meeting #110, Feb. 20-24, 2023, 4 pages.

* cited by examiner

SECURITY MANAGEMENT OF TRUSTED NETWORK FUNCTIONS

RELATED APPLICATION

This application claims priority to U.S. Provisional Application Ser. No. 63/353,203 filed Jun. 17, 2022 entitled "Security Management of Trusted Network Functions," the disclosure of which is incorporated by reference herein in its entirety.

TECHNICAL FIELD

The present disclosure relates to wireless communications, and more specifically to access control and security policy management of network functions.

BACKGROUND

A wireless communications system may include one or multiple network communication devices, such as base stations, which may be otherwise known as an eNodeB (eNB), a next-generation NodeB (gNB), or other suitable terminology. Each network communication devices, such as a base station may support wireless communications for one or multiple user communication devices, which may be otherwise known as user equipment (UE), or other suitable terminology. The wireless communications system may support wireless communications with one or multiple user communication devices by utilizing resources of the wireless communications system, such as time resources (e.g., symbols, slots, subframes, frames, or the like) or frequency resources (e.g., subcarriers, carriers). Additionally, the wireless communications system may support wireless communications across various radio access technologies including third generation (3G) radio access technology, fourth generation (4G) radio access technology, fifth generation (5G) radio access technology, among other suitable radio access technologies beyond 5G (e.g., sixth generation (6G)).

Various network functions (NFs) in a network infrastructure, such as in the access network and core network of a wireless communications system, have defined external interfaces and functional behavior. In practical terms, a network function may be implemented by or as a network node, or as a network device. The NFs communicate with each other after mutual authentication and authorization, and network functions in a 5G system are implicitly trusted. A NF may be a NF service consumer and/or a NF service producer (or NF provider). Generally, a NF service consumer consumes services provided by another NF, and a NF service producer provides services that can be consumed by another NF. In a network infrastructure, a NF may function as both a NF service consumer and a NF service producer for different services.

SUMMARY

The present disclosure relates to methods, apparatuses, and systems that support security management of trusted network functions. By utilizing the described techniques, aspects of access control and security policy management for trusted network service operations are enabled. The described techniques enable a network repository function (NRF) the ability to allow only trusted NFs to register, offer services, and consume services in a network. In implementations, trust data and security state information related to a NF can be used to enforce access control policies during various network security operations related to scenarios, such as for NF service discovery, service registration, authentication, authorization, and service requests. Given a zero-trust policy of NFs in a network infrastructure, such as in the access network and core network of a wireless communications system, aspects of security management of trusted network functions provide for NF authentication and authorization, such as during NF discovery, NF registration (e.g., for NF service producer registrations), and access token request (e.g., for authorization of NF service access to allow NF service consumers to access services from NF service producers). The NRF can implement explicit trust techniques to enforce NF access control and security policies to identify and allow only trusted NFs to perform NF discovery, NF registration, or to obtain an access token.

Some implementations of the method and apparatuses described herein may further include a NRF that receives a first signaling as a NF request from a NF, where the NF request includes at least a NF type, a NF identifier (ID), and NF security state information. The NRF verifies a NF security state based on the NF ID and the NF security state information, and transmits a second signaling as a NF response, where the NF response includes a security verification of the NF request.

In some implementations of the method and apparatuses described herein, the NRF enforces access control security policies for services associated with the NF. The NRF generates the access control security policies for the services associated with the NF based on one or more of an established policy, NF profile information, the NF security state information, or an allowed trust level(s) for the services associated with the NF. The NRF enforces the access control security policies based on allowed trust range values for a NF service consumer to consume the services associated with the NF, and the NRF transmits a third signaling as the allowed trust range values to a NF service producer to allow the NF service consumer with the allowed trust range values to consume the services associated with the NF. The NF response includes one or more allowed trust levels for services associated with the NF. The NRF allocates the one or more allowed trust levels for the services associated with the NF based on established policy, NF trust information, and NF security data. The NRF verifies the NF security state information by verifying the authentication code of the NF security state information using a public key or a shared secret key. The NRF verifies the NF security state information by matching the NF ID or a NF instance ID corresponding to stored NF security state information associated with the NF. The NRF stores a NF profile of the NF, the NF profile including at least the NF ID, the stored NF security state information associated with the NF, and trust evaluation information associated with the NF.

In some implementations of the method and apparatuses described herein, the NF request is received as a NF registration request from the NF, and the NF response is transmitted as a NF registration response to the NF. Alternatively, the NF request is received as a NF registration update request from the NF, and the NF response is transmitted as a NF registration update response to the NF. Alternatively, the NF request is received as a NF discovery request from the NF, and the NF response is transmitted as a NF discovery response to the NF.

Some implementations of the method and apparatuses described herein may further include a NRF receiving a first signaling as a NF request from a NF, the NF request including a NF type, a NF ID, and NF security state information. The NRF verifying a NF security state based on the NF ID and the NF security state information. The NRF transmitting a second signaling as a NF response, the NF response including a security verification of the NF request.

In some implementations of the method and apparatuses described herein, the NRF enforcing access control security policies for services associated with the NF. The NRF generating the access control security policies for the services associated with the NF based on at least one or more of an established policy, NF profile information, the NF security state information, or an allowed trust level(s) for the services associated with the NF. The NRF enforcing the access control security policies based on allowed trust range values for a NF service consumer to consume the services associated with the NF, and the NRF transmitting a third signaling as the allowed trust range values to a NF service producer to allow the NF service consumer with the allowed trust range values to consume the services associated with the NF. The NRF verifying the NF security state information by verifying the authentication code of the NF security state information using a public key or a shared secret key. The NRF verifying the NF security state information by matching the NF ID or a NF instance ID corresponding to stored NF security state information associated with the NF. The NRF storing a NF profile of the NF, the NF profile including at least the NF ID, the stored NF security state information associated with the NF, and trust evaluation information associated with the NF.

Some implementations of the method and apparatuses described herein may further include a NRF that receives a first signaling as an access token request from a NF service consumer, the access token request including at least NF profile information and NF security state information. The NRF authorizes the NF service consumer based on the NF profile information and the NF security state information. The NRF transmits a second signaling as an access token response to the NF service consumer, where the access token response includes an access token.

In some implementations of the method and apparatuses described herein, the NRF generates the access token allowing the NF service consumer to access a service associated with a NF service producer. The NRF authorizes the NF service consumer based on access control security policies, and/or based on trust evaluation data stored by the apparatus. The NRF, to authorize the NF service consumer, transmits a NF trust request to a trust evaluation service, where the NF trust request includes at least a NF ID of the NF service consumer and the NF security state information. The NRF then receives a NF trust response from the trust evaluation service, where the NF trust response includes a trust verification of the NF service consumer. The access token includes NF trust information associated with the NF service consumer. The NF profile information and the NF security state information is digitally signed by the NF service consumer with a private key or a shared secret key of the NF service consumer.

Some implementations of the method and apparatuses described herein may further include a NRF receiving a first signaling as an access token request from a NF service consumer, the access token request including at least NF profile information and NF security state information. The NRF authorizing the NF service consumer based on the NF profile information and the NF security state information. The NRF transmitting a second signaling as an access token response to the NF service consumer, the access token response including an access token.

In some implementations of the method and apparatuses described herein, the NRF generating the access token allowing the NF service consumer to access a service associated with a NF service producer. The NF service consumer is authorized based on access control security policies, or based on stored trust evaluation data. The NRF authorizing the NF service consumer includes transmitting a NF trust request to a trust evaluation service, the NF trust request including at least a NF ID of the NF service consumer and the NF security state information, and the NRF receiving a NF trust response from the trust evaluation service, the NF trust response including a trust verification of the NF service consumer. The access token includes NF trust information associated with the NF service consumer.

Some implementations of the method and apparatuses described herein may further include a NF service producer receives a first signaling as a NF service request from a NF service consumer, the NF service request including a NF ID of the NF service consumer and an access token with NF trust information. The NF service producer verifies the NF trust information associated with the NF ID allowing a requested service of the NF service request. The NF service producer transmits a second signaling as a NF service response to the NF service consumer.

In some implementations of the method and apparatuses described herein, the NF service producer executes the requested service for the NF service consumer. The NF service producer verifies the NF service request based on access control security policies. The NF service producer authorizes the NF service request based on trust evaluation data stored by the apparatus. The NF service producer verifies the NF service request by further transmitting a NF trust request to a trust evaluation service, where the NF trust request includes the NF ID of the NF service consumer and the NF trust information, and receiving a NF trust response from the trust evaluation service, where the NF trust response includes a trust verification of the NF service request.

Some implementations of the method and apparatuses described herein may further include a NF service producer receiving a first signaling as a NF service request from a NF service consumer, the NF service request including at least a NF ID of the NF service consumer and an access token with NF trust information. The NF service producer verifying the NF trust information associated with the NF ID allowing a requested service of the NF service request. The NF service producer transmitting a second signaling as a NF service response to the NF service consumer.

In some implementations of the method and apparatuses described herein, the NF service producer executing the requested service for the NF service consumer. The NF service producer verifying the NF service request based at least in part on access control security policies. The NF service producer authorizing the NF service request based at least in part on trust evaluation data stored by the apparatus. The NF service producer verifying the NF trust information by transmitting a NF trust request to a trust evaluation service, where the NF trust request includes at least the NF ID of the NF service consumer and the NF trust information. The NF service producer receiving a NF trust response from the trust evaluation service, where the NF trust response includes a trust verification of the NF service request.

DETAILED DESCRIPTION

Figure 1:
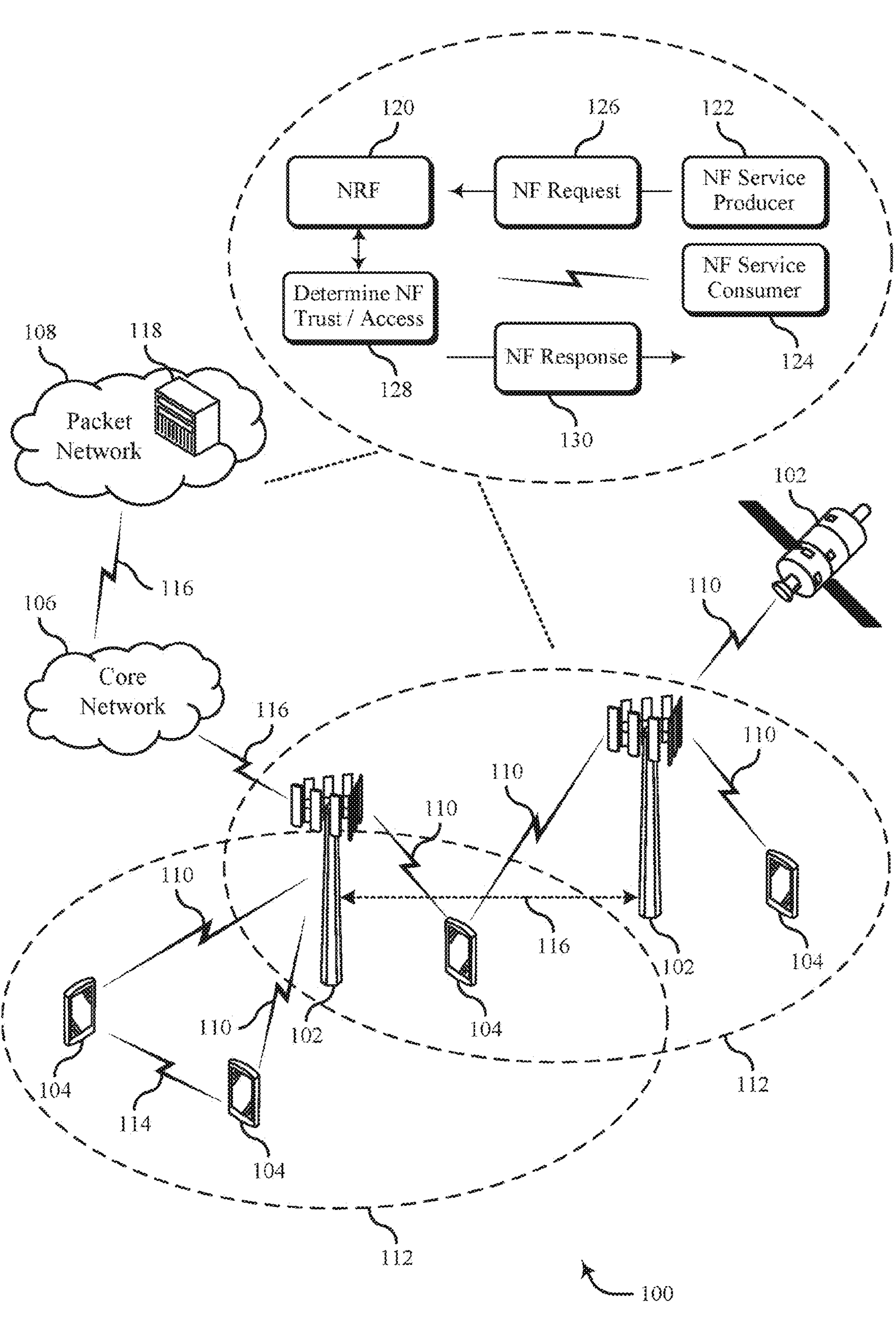
FIG. 1 illustrates an example of a wireless communications system that supports security management of trusted network functions in accordance with aspects of the present disclosure.

Various NFs in a network infrastructure, such as in the access network and core network of a wireless communications system, have defined external interfaces and functional behavior. The NFs communicate with each other after mutual authentication and authorization, and network functions in a 5G system are implicitly trusted (i.e., the NFs are trusted without performing a real-time or continuous trust evaluation). Therefore, if any NF is under attack or has already been compromised or hijacked, then there is a potential risk that, even after successful mutual authentication and authorization, the compromised NF will remain malicious and unidentified. This presents security management problems for trusted network service operations. If a compromised NF (or NF under threat) operates as a NF service producer, this may impact the other communicating NFs, such as NF service consumers, by allowing the lateral movement of a compromising attack leading to network service failure. Further, if a compromised NF (or NF under threat) is allowed to provide service to UEs and other NFs within the network, this may lead to compromising issues in the network, such as data theft, service failure, denial of service, resource hijacking, and other failure issues.

A conventional NRF performs NF authentication, such as during NF discovery, NF registration (e.g., for NF service producer registrations), and access token request (e.g., for authorization of NF service access to allow NF service consumers to access services from NF service producers) with direct communication or indirect communication (e.g., via a service communication proxy (SCP)). However, a conventional NRF does not maintain or verify any trust information or security state information related to a NF, and therefore the NRF does not enforce any dynamic access control or security policies to identify and allow only trusted NFs to perform NF discovery, NF registration, or to obtain an access token. Further the NRF does not have the functionality to identify a compromised NF and reject the requests related to NF discovery, NF registration, and access token requests.

Aspects of the disclosure are directed to security management of trusted network functions, and enable a NRF the ability to allow only trusted NFs to register, offer services, and consume services in a network. In implementations, trust data and security state information related to a NF can be used to enforce access control policies during various network operations, such as for NF service discovery, service registration, authentication, authorization, and service requests. The trust data may include trust evaluation information, such as analytics information related to a security state, behavior attributes and analytics, service operations, and/or environmental attributes of a network function, as well as any other information related to network operational security. Trust evaluation information related to any network function, application function, or device may be an analytics information related to a security state (e.g., an observable state, such as software versions installed, the network, a network function location, a time and/or date of a request, a certificate status (e.g., expiry, renewal, revocation, etc.), a lack of configured credential rotation (e.g., if a credential refreshment is not performed within a certain lifetime of the NF, the trust level can be impacted), previously observed behavior, installed credentials, telemetry data, data about what is happening inside a network function which can impact the business objectives and service experience, a network function, a network state, a device state, an interface state, applications running, open ports information, closed ports information, access or configuration violation information, expected configuration information, behavior (e.g., behavior attributes may include automated subject analytics, device analytics, and measured deviations from observed usage patterns, etc.), service operations (e.g., may include any deviations in regular and specified service operations), environmental attributes (e.g., may include factors such as requestor network location, time, any reported active attacks, etc.) of a network function, and/or any information related to the network functional or operational security.

The techniques described herein directed to security management of trusted network functions provide for NF authentication and authorization, such as during NF discovery, NF registration (e.g., for NF service producer registrations), and access token request (e.g., for authorization of NF service access to allow NF service consumers to access services from NF service producers). The NRF can implement explicit trust techniques to enforce NF access control and security policies to identify and allow only trusted NFs to perform NF discovery, NF registration, or to obtain an access token.

Aspects of the present disclosure are described in the context of a wireless communications system. Aspects of the present disclosure are further illustrated and described with reference to device diagrams and flowcharts.

FIG. 1 illustrates an example of a wireless communications system 100 that supports security management of trusted network functions in accordance with aspects of the present disclosure. The wireless communications system 100 may include one or more network entities 102, one or more UEs 104, a core network 106, and a packet data network 108. The wireless communications system 100 may support various radio access technologies. In some implementations, the wireless communications system 100 may be a 4G network, such as an LTE network or an LTE-Advanced (LTE-A) network. In some other implementations, the wireless communications system 100 may be a 5G network, such as an NR network. In other implementations, the wireless communications system 100 may be a combination of a 4G network and a 5G network, or other suitable radio access technology including Institute of Electrical and Electronics Engineers (IEEE) 802.11 (Wi-Fi), IEEE 802.16 (WiMAX), IEEE 802.20. The wireless communications system 100 may support radio access technologies beyond 5G. Additionally, the wireless communications system 100 may support technologies, such as time division multiple access (TDMA), frequency division multiple access (FDMA), or code division multiple access (CDMA), etc.

The one or more network entities 102 may be dispersed throughout a geographic region to form the wireless communications system 100. One or more of the network entities 102 described herein may be or include or may be referred to as a network node, a base station, a network element, a radio access network (RAN), a base transceiver station, an access point, a NodeB, an eNodeB (eNB), a next-generation NodeB (gNB), or other suitable terminology. A network entity 102 and a UE 104 may communicate via a communication link 110, which may be a wireless or wired connection. For example, a network entity 102 and a UE 104 may perform wireless communication (e.g., receive signaling, transmit signaling) over a Uu interface.

A network entity 102 may provide a geographic coverage area 112 for which the network entity 102 may support services (e.g., voice, video, packet data, messaging, broadcast, etc.) for one or more UEs 104 within the geographic coverage area 112. For example, a network entity 102 and a UE 104 may support wireless communication of signals related to services (e.g., voice, video, packet data, messaging, broadcast, etc.) according to one or multiple radio access technologies. In some implementations, a network entity 102 may be moveable, for example, a satellite associated with a non-terrestrial network. In some implementations, different geographic coverage areas 112 associated with the same or different radio access technologies may overlap, but the different geographic coverage areas 112 may be associated with different network entities 102. Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The one or more UEs 104 may be dispersed throughout a geographic region of the wireless communications system 100. A UE 104 may include or may be referred to as a mobile device, a wireless device, a remote device, a remote unit, a handheld device, or a subscriber device, or some other suitable terminology. In some implementations, the UE 104 may be referred to as a unit, a station, a terminal, or a client, among other examples. Additionally, or alternatively, the UE 104 may be referred to as an Internet-of-Things (IoT) device, an Internet-of-Everything (IoE) device, or machine-type communication (MTC) device, among other examples. In some implementations, a UE 104 may be stationary in the wireless communications system 100. In some other implementations, a UE 104 may be mobile in the wireless communications system 100.

The one or more UEs 104 may be devices in different forms or having different capabilities. Some examples of UEs 104 are illustrated in FIG. 1. A UE 104 may be capable of communicating with various types of devices, such as the network entities 102, other UEs 104, or network equipment (e.g., the core network 106, the packet data network 108, a relay device, an integrated access and backhaul (IAB) node, or another network equipment), as shown in FIG. 1. Additionally, or alternatively, a UE 104 may support communication with other network entities 102 or UEs 104, which may act as relays in the wireless communications system 100.

A UE 104 may also be able to support wireless communication directly with other UEs 104 over a communication link 114. For example, a UE 104 may support wireless communication directly with another UE 104 over a device-to-device (D2D) communication link. In some implementations, such as vehicle-to-vehicle (V2V) deployments, vehicle-to-everything (V2X) deployments, or cellular-V2X deployments, the communication link 114 may be referred to as a sidelink. For example, a UE 104 may support wireless communication directly with another UE 104 over a PC5 interface.

A network entity 102 may support communications with the core network 106, or with another network entity 102, or both. For example, a network entity 102 may interface with the core network 106 through one or more backhaul links 116 (e.g., via an S1, N2, or another network interface). The network entities 102 may communicate with each other over the backhaul links 116 (e.g., via an X2, Xn, or another network interface). In some implementations, the network entities 102 may communicate with each other directly (e.g., between the network entities 102). In some other implementations, the network entities 102 may communicate with each other or indirectly (e.g., via the core network 106). In some implementations, one or more network entities 102 may include subcomponents, such as an access network entity, which may be an example of an access node controller (ANC). An ANC may communicate with the one or more UEs 104 through one or more other access network transmission entities, which may be referred to as a radio heads, smart radio heads, or transmission-reception points (TRPs).

In some implementations, a network entity 102 may be configured in a disaggregated architecture, which may be configured to utilize a protocol stack physically or logically distributed among two or more network entities 102, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 102 may include one or more of a central unit (CU), a distributed unit (DU), a radio unit (RU), a RAN Intelligent Controller (RIC) (e.g., a Near-Real Time RIC (Near-RT RIC), a Non-Real Time RIC (Non-RT RIC)), a Service Management and Orchestration (SMO) system, or any combination thereof.

An RU may also be referred to as a radio head, a smart radio head, a remote radio head (RRH), a remote radio unit (RRU), or a transmission reception point (TRP). One or more components of the network entities 102 in a disaggregated RAN architecture may be co-located, or one or more components of the network entities 102 may be located in distributed locations (e.g., separate physical locations). In some implementations, one or more network entities 102 of a disaggregated RAN architecture may be implemented as virtual units (e.g., a virtual CU (VCU), a virtual DU (VDU), a virtual RU (VRU)).

Split of functionality between a CU, a DU, and an RU may be flexible and may support different functionalities depending upon which functions (e.g., network layer functions, protocol layer functions, baseband functions, radio frequency functions, and any combinations thereof) are performed at a cU, a Du, or an RU. For example, a functional split of a protocol stack may be employed between a CU and a DU such that the CU may support one or more layers of the protocol stack and the DU may support one or more different layers of the protocol stack. In some implementations, the CU may host upper protocol layer (e.g., a layer 3 (L3), a layer 2 (L2)) functionality and signaling (e.g., Radio Resource Control (RRC), service data adaption protocol (SDAP), Packet Data Convergence Protocol (PDCP)). The CU may be connected to one or more DUs or RUs, and the one or more DUs or RUs may host lower protocol layers, such as a layer 1 (L1) (e.g., physical (PHY) layer) or an L2 (e.g., radio link control (RLC) layer, medium access control (MAC) layer) functionality and signaling, and may each be at least partially controlled by the CU.

Additionally, or alternatively, a functional split of the protocol stack may be employed between a DU and an RU such that the DU may support one or more layers of the protocol stack and the RU may support one or more different layers of the protocol stack. The DU may support one or multiple different cells (e.g., via one or more RUs). In some implementations, a functional split between a CU and a DU, or between a DU and an RU may be within a protocol layer (e.g., some functions for a protocol layer may be performed by one of a CU, a DU, or an RU, while other functions of the protocol layer are performed by a different one of the CU, the DU, or the RU).

A CU may be functionally split further into CU control plane (CU-CP) and CU user plane (CU-UP) functions. A CU may be connected to one or more DUs via a midhaul communication link (e.g., F1, F1-c, F1-u), and a DU may be connected to one or more RUs via a fronthaul communication link (e.g., open fronthaul (FH) interface). In some implementations, a midhaul communication link or a fronthaul communication link may be implemented in accordance with an interface (e.g., a channel) between layers of a protocol stack supported by respective network entities 102 that are in communication via such communication links.

The core network 106 may support user authentication, access authorization, tracking, connectivity, and other access, routing, or mobility functions. The core network 106 may be an evolved packet core (EPC), or a 5G core (5GC), which may include a control plane entity that manages access and mobility (e.g., a mobility management entity (MME), an access and mobility management functions (AMF)) and a user plane entity that routes packets or interconnects to external networks (e.g., a serving gateway (S-GW), a Packet Data Network (PDN) gateway (P-GW), or a user plane function (UPF)). In some implementations, the control plane entity may manage non-access stratum (NAS) functions, such as mobility, authentication, and bearer management (e.g., data bearers, signal bearers, etc.) for the one or more UEs 104 served by the one or more network entities 102 associated with the core network 106.

The core network 106 may communicate with the packet data network 108 over one or more backhaul links 116 (e.g., via an S1, N2, or another network interface). The packet data network 108 may include an application server 118. In some implementations, one or more UEs 104 may communicate with the application server 118. A UE 104 may establish a session (e.g., a protocol data unit (PDU) session, or the like) with the core network 106 via a network entity 102. The core network 106 may route traffic (e.g., control information, data, and the like) between the UE 104 and the application server 118 using the established session (e.g., the established PDU session). the PDU session may be an example of a logical connection between the UE 104 and the core network 106 (e.g., one or more network functions of the core network 106).

In the wireless communications system 100, the network entities 102 and the UEs 104 may use resources of the wireless communications system 100, such as time resources (e.g., symbols, slots, subframes, frames, or the like) or frequency resources (e.g., subcarriers, carriers) to perform various operations (e.g., wireless communications). In some implementations, the network entities 102 and the UEs 104 may support different resource structures. For example, the network entities 102 and the UEs 104 may support different frame structures. In some implementations, such as in 4G, the network entities 102 and the UEs 104 may support a single frame structure. In some other implementations, such as in 5G and among other suitable radio access technologies, the network entities 102 and the UEs 104 may support various frame structures (e.g., multiple frame structures). The network entities 102 and the UEs 104 may support various frame structures based on one or more numerologies.

One or more numerologies may be supported in the wireless communications system 100, and a numerology may include a subcarrier spacing and a cyclic prefix. A first numerology (e.g., $\mu$=0) may be associated with a first subcarrier spacing (e.g., 15 kHz) and a normal cyclic prefix. The first numerology (e.g., $\mu$=0) associated with the first subcarrier spacing (e.g., 15 kHz) may utilize one slot per subframe. A second numerology (e.g., $\mu$=1) may be associated with a second subcarrier spacing (e.g., 30 kHz) and a normal cyclic prefix. A third numerology (e.g., $\mu$=2) may be associated with a third subcarrier spacing (e.g., 60 kHz) and a normal cyclic prefix or an extended cyclic prefix. A fourth numerology (e.g., $\mu$=3) may be associated with a fourth subcarrier spacing (e.g., 120 kHz) and a normal cyclic prefix. A fifth numerology (e.g., $\mu$=4) may be associated with a fifth subcarrier spacing (e.g., 240 kHz) and a normal cyclic prefix.

A time interval of a resource (e.g., a communication resource) may be organized according to frames (also referred to as radio frames). Each frame may have a duration, for example, a 10 millisecond (ms) duration. In some implementations, each frame may include multiple subframes. For example, each frame may include 10 subframes, and each subframe may have a duration, for example, a 1 ms duration. In some implementations, each frame may have the same duration. In some implementations, each subframe of a frame may have the same duration.

Additionally or alternatively, a time interval of a resource (e.g., a communication resource) may be organized according to slots. For example, a subframe may include a number (e.g., quantity) of slots. Each slot may include a number (e.g., quantity) of symbols (e.g., orthogonal frequency division multiplexing (OFDM) symbols). In some implementations, the number (e.g., quantity) of slots for a subframe may depend on a numerology. For a normal cyclic prefix, a slot may include 14 symbols. For an extended cyclic prefix (e.g., applicable for 60 kHz subcarrier spacing), a slot may include 12 symbols. The relationship between the number of symbols per slot, the number of slots per subframe, and the number of slots per frame for a normal cyclic prefix and an extended cyclic prefix may depend on a numerology. It should be understood that reference to a first numerology (e.g., $\mu$=0) associated with a first subcarrier spacing (e.g., 15 kHz) may be used interchangeably between subframes and slots.

In the wireless communications system 100, an electromagnetic (EM) spectrum may be split, based on frequency or wavelength, into various classes, frequency bands, frequency channels, etc. By way of example, the wireless communications system 100 may support one or multiple operating frequency bands, such as frequency range designations FR1 (410 MHz-7.125 GHZ), FR2 (24.25 GHz-52.6 GHz), FR3 (7.125 GHz-24.25 GHz), FR4 (52.6 GHz-114.25 GHz), FR4a or FR4-1 (52.6 GHz-71 GHz), and FR5 (114.25 GHz-300 GHz). In some implementations, the network entities 102 and the UEs 104 may perform wireless communications over one or more of the operating frequency bands. In some implementations, FR1 may be used by the network entities 102 and the UEs 104, among other equipment or devices for cellular communications traffic (e.g., control information, data). In some implementations, FR2 may be used by the network entities 102 and the UEs 104, among other equipment or devices for short-range, high data rate capabilities.

FR1 may be associated with one or multiple numerologies (e.g., at least three numerologies). For example, FR1 may be associated with a first numerology (e.g., $\mu$=0), which includes 15 kHz subcarrier spacing; a second numerology (e.g., $\mu$=1), which includes 30 kHz subcarrier spacing; and a third numerology (e.g., $\mu$=2), which includes 60 kHz subcarrier spacing. FR2 may be associated with one or multiple numerologies (e.g., at least 2 numerologies). For example, FR2 may be associated with a third numerology (e.g., $\mu$=2), which includes 60 kHz subcarrier spacing; and a fourth numerology (e.g., $\mu$=3), which includes 120 kHz subcarrier spacing.

According to implementations, one or more network entities are operable to implement various aspects of security management of trusted network functions as described herein. In one or more implementations, a NRF 120 allows only trusted NFs (e.g., network functions in the core network 106 and/or in the packet data network 108) to register, offer services, and consume services in a network. In implementations, trust data and security state information related to a NF service producer 122 or a NF service consumer 124 can be used to enforce access control policies during various network operations, such as for NF service discovery, service registration, authentication, authorization, and service requests. For example, the NF service producer 122 or NF service consumer 124 communicates (e.g., transmits) a NF request 126 (e.g., a NF register request, a NF registration update request, or NF discovery request) to the NRF. The NRF 120 receives the NF request 126 and determines (at 128) the NF trust information and manages the access security policies for the NF service producer 122 or NF service consumer 124. The NRF 120 generates a NF response 130 (e.g., a NF register response, a NF registration update response, or a NF discovery response) and communicates (e.g., transmits) the NF response to the requesting NF service producer 122 or NF service consumer 124.

A conventional NRF performs NF authentication, such as during NF discovery, NF registration (e.g., for NF service producer registrations), and access token request (e.g., for authorization of NF service access to allow NF service consumers to access services from NF service producers) with direct communication or indirect communication (e.g., via a SCP). The NRF supports functionality that includes the service discovery function. For example, the NRF receives a NF discovery request from a NF instance or SCP, and provides the information of the discovered NF instances (or instances to be discovered) to the NF instance or SCP. The NRF supports proxy-call session control function (P-CSCF) discovery, which is a specialized case of an application function (AF) discovery by the session management function (SMF). The NRF maintains the NF profile of available NF instances and their supported services. The NRF also maintains a SCP profile of available SCP instances, and supports SCP discovery by SCP instances. The NRF notifies about newly registered, updated, and deregistered NF and SCP instances along with its potential NF services to the subscribed NF service consumer or SCP. The NRF also maintains the health status of NFs and SCP.

However, a conventional NRF does not maintain or verify any trust information or security state information related to a NF, and therefore the NRF does not enforce any dynamic access control or security policies to identify and allow only trusted NFs to perform NF discovery, NF registration, or to obtain an access token. Further the NRF does not have the functionality to identify a compromised NF and reject the requests related to NF discovery, NF registration, and access token requests. Some security features are supported in current system architectures for secure communications between different NFs (for both direct and indirect communications). The security features include authentication and authorization between network functions and the NRF; authentication and authorization between network functions; client credentials assertion based authentication; and authorization of NF service access. However, none of these security features support real-time trust evaluation, or dynamic or continuous trust evaluation of the network functions in the 5G system. If any NF is under threat or compromised in the core network, the lack of dynamic trust evaluation will allow the impacted NF to remain unidentified in the network, which may lead to a service failure, data loss and theft, and/or lateral movement of the attack. Notably, current security policy enforcement based on dynamic or continuous trust evaluation is not currently supported by the 5G system.

Aspects of the present disclosure are directed to security management of trusted network functions, and enable a NRF the ability to allow only trusted NFs to register, offer services, and consume services in a network. In implementations, trust data and security state information related to a NF can be used to enforce access control policies during various network operations, such as for NF service discovery, service registration, authentication, authorization, and service requests. The trust data may include trust evaluation information, such as analytics information related to a security state (e.g., an observable state, such as software versions installed, configuration information, network function location, time and date of request, previously observed behavior, and installed credentials); behavior and analytics (e.g., behavior attributes may include automated subject analytics, device analytics, and measured deviations from observed usage patterns, etc.); service operations (e.g., any deviations in regular and specified service operations); and/or environmental attributes (e.g., factors such as requestor network location, time, any reported active attacks, etc.) of a network function, as well as any other information related to network operational security.

In a first implementation as related to security management of trusted network functions, a NRF supports NF service registration with fine granular service access control security policies. A NRF can manage the NF security state of the NF service producers that are registered to the NRF. The NF security state may include any of the observable state, network system security posture, configurations, software versions installed, allowed open ports, applications that are running, open connections, etc. Further, the NRF can apply security policies based on the available trust data and/or trust evaluation information to allow only trusted NF service producers to register with the NRF and to enforce access control to allow only trusted NF service consumers to consume the registered NF producer services.

Figures 2, 3:
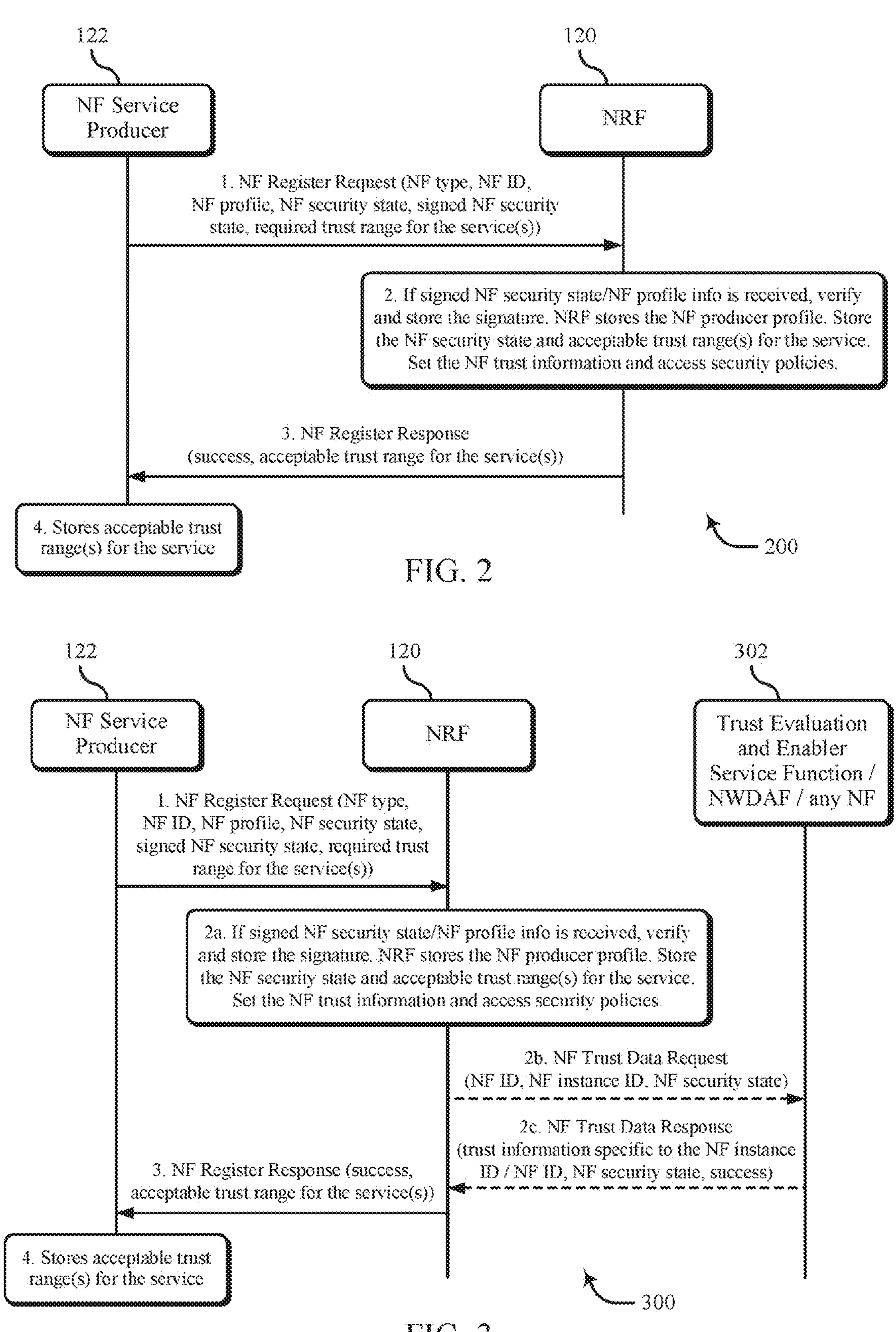
FIGS. 2-6 illustrate examples of signaling diagrams that support security management of trusted network functions in accordance with aspects of the present disclosure.

FIG. 2 illustrates an example of a signaling diagram 200 that supports security management of trusted network functions in accordance with aspects of the present disclosure, and shows the NF registration with fine granular service access control security policies. A NF service producer 122 (e.g., an NF instance) transmits to the NRF 120 (at step 1), a NF registration request message to inform the NRF of its NF profile when the NF service producer (e.g., NF service consumer of NRF services) becomes operative for the first time. A NF registration request message can include the NF type, the NF identification information, such as NF ID, a NF security state, and NF profile configuration data, which may include additional scope information that indicates the resources and the actions (service operations) that are allowed on these resources for the NF service consumer. These resources may be per NF type of the NF service consumer or per NF instance ID of the NF service consumer. The NF registration request message can also include a signed NF security state and required trust range for the service(s). The required trust range information indicates trust level(s) for the type of NFs and NF service consumers to be eligible to consume the services offered by the registering NF service producer.

The NF service producer can use its private key or a shared secret key to sign the NF security state information or NF profile containing NF security state information to be sent to the NRF. The NF service producer's NF profile, along with the NF security state, can be configured by the operation, administration, and maintenance (OAM) system. As an alternative, the NF registration request message (at step 1) can include a NF profile instead of the NF security state, where the NF security state can be part of the NF profile information maintained in the NRF and, in this case, the signed NF profile may be sent. As another alternative, the NF registration request message (at step 1) can include either message authentication code/digest of the NF security state information, or a NF profile containing NF security state information, and the shared secret key is used to generate the related MAC/digest.

If a signed NF security state or signed NF profile containing NF security state is received, then the NRF (at step 2) can verify the signature using either the public key of the NF service producer or using a shared secret key. The NRF stores the NF profile, the NF security state, an acceptable and/or required trust range for the service(s), and marks the NF service producer available. Based on the NF profile information, the NF security state, the required trust range for the service(s), and trust evaluation information or security monitoring information (if any available for specific NF types, NF service consumers and/or producers), the NRF sets the access security policies to be enforced for various NF types, NF service producers (which can provide services) and NF service consumers (which can request to consume the registered NF services of the NF service producers). The access security policy or policies may include a list of NF IDs, NF instance IDs, NF types, a corresponding trust information set (e.g., trust range value(s)), security monitoring data (e.g., a security state of the NF), a service provision restriction list (e.g., if the NF is a service producer) or a service consumption restriction list (e.g., if the NF is a service consumer), and a resource access restriction list (e.g., general NF, NF services, network data and UE data access restriction list).

The NRF may also set an acceptable trust range for the services considering various aspects, such as operator local policy, the required trust range for the services, trust evaluation information, security monitoring data if available for the NF service producers, and trust evaluation information, as well as security monitoring data if available for the NF service consumers. Access security policies can be alternatively termed as access control policies or security policies. Further, the required trust range for the services can be alternatively termed as a preferred trust range for the services consumption. The acceptable trust range for the services can be alternatively termed as an authorized or allowed trust range for the services consumption. The required trust range for the services and acceptable or allowed trust range for the services can include a list of trust range values (e.g., as confidence values), such as any of critical, very low, low, medium, high, very high, etc., to indicate the category of a NF trust level and security level (e.g., NF service consumers) who may consume the service(s) of the NF service producers. As an alternative, the NF security state of a NF can be part of its NF public certification and/or certificates.

FIG. 3 illustrates an example of a signaling diagram 300 that supports security management of trusted network functions in accordance with aspects of the present disclosure. The signaling diagram 300 further illustrates aspects of the signaling diagram 200, where step 2 as shown and described with reference to FIG. 2 is step 2a in FIG. 3. As an alternative, if the NRF does not have trust evaluation data and security monitoring data available for the NF service producer, then the NRF may perform steps 2b and 2c to obtain the trust evaluation data specific to the NF service producer instance.

The NRF transmits a NF trust data request (at step 2b) to a NF 302, such as to a network data analytics function (NWDAF), a trust evaluation service and enabler service function (TESF), or any other NF that implements NF trust evaluation, trust identification, a security monitoring function or service. The NF trust data request can include a NF service producer ID, such as NF instance ID or client ID, and if available, the NF security state information of the NF service producer.

The NF 302 (e.g., NWDAF, TESF, or any NF) which implements NF trust evaluation, trust identification, and/or a security monitoring function or service, obtains (fetches) the most recent trust evaluation information and/or trust data specific to the NF producer's instance ID (or performs a trust evaluation procedure for the NF instance ID received in step 2b), and provides the trust information (e.g., evaluated trust range value(s)) to the NRF (at step 2c) in a NF trust data response message. If the NF receives NF security state information from the NF service producer (at step 2b), then the NF (e.g., NWDAF, TESF, or any NF) can verify the received NF security state information with the locally managed NF security state information corresponding to the NF service producer ID, and if the match is successful, the verification of the NF security state is considered successful. The NF trust data response message can also include a NF service producer ID and/or instance ID related to the trust information and the verified NF service producer's security state information, along with a success indication.

The NRF acknowledges that the NF service registration is accepted (at step 3, FIGS. 2 and 3) by sending a NF register response with an indication of success and an acceptable (or allowed) trust range for the services information (e.g., if the NRF determines the acceptable trust range for the services information), if the NRF successfully stores the NF profile, the NF security state, the trust evaluation data specific to the NF service producer, and the acceptable trust range for the services information to be consumed by other NF service consumers. As an alternative, if the signing or MAC verification related to the NF security state, or the NF profile fails, or if the NF service producer trust evaluation information falls below the acceptable trust value(s) information or threshold locally configured to allow a NF registration, the NRF does not store any information received in step 1, and the NRF can transmit the NF register response at step 3 with an error code and a trust validation failure indication.

The NF service producer can receive a success indication (at step 4), and if it also receives acceptable (or allowed) trust range(s) for the service(s) information, the NF service producer can store the acceptable trust range(s) for the service(s) information, which is used to limit the NF service consumers accordingly when a service is requested from a NF service consumer. The NF service producer and a NF service consumer as described in this implementation can cover all network functions, application functions, or any logical functions that may be implemented in a wireless communications system (e.g., a 5 GS).

In aspects of security management of trusted network functions, the described steps of FIGS. 2 and 3 may be applicable for a network service registration procedure. The NF service producer 122 (e.g., an NF instance) transmits (at step 1) to the NRF 120, a NF registration update request message to inform the NRF of its updated NF profile or updated NF security state information. A NF registration update request message can include the NF type, NF ID, updated NF security state, and NF profile configuration data, which may include additional scope information that indicates the resources and the actions (service operations) that are allowed on these resources for a NF service consumer. These resources may be per NF type of the NF service consumer or per the NF instance ID of the NF service consumer. The NF registration update request message can also include a signed updated NF security state and required trust range for the service, where acceptable trust range information will indicate the required trust level for the type of NFs and NF service consumers that are eligible as consumers of the services offered by the registering NF service producer.

The NF service producer can use its private key or a shared secret key to sign the NF security state information or NF profile containing the NF security state information to be sent to the NRF. As an alternative, the NF registration update request message (at step 1) can include a NF profile instead of a NF security state, where the NF security state can be part of the NF profile information maintained in the NRF and, in this case, a signed NF profile can be sent. As another alternative, the NF registration update request message (at step 1) can include either a message authentication code/digest of the NF security state information or a NF profile containing NF security state information, and the shared secret key is used to generate the related MAC/digest.

If a signed, updated NF security state or a signed, updated NF profile containing a NF security state is received (at step 2), then the NRF can verify the signature using either the public key of the NF service producer or using a shared secret key. The NRF verifies whether the updated NF security state has any security violations. This security violation check can be performed by the NRF based on the operator's local configuration which lists out the essential NF security state to be supported or configured in the NF service producer. If there are no security violations, the NRF stores the updated NF profile, the updated NF security state, the acceptable and/or required trust range for the service, and marks the NF service consumer available.

The NRF acknowledges that the NF service registration is accepted (at step 3) by transmitting a NF register update response with an indication of success and an acceptable trust range for the service(s) information if the NRF successfully stores the NF profile, the NF security state, and if it also determines the acceptable and/or required trust range for the service information. As an alternative, if the signing or MAC verification related to the NF security state or the NF profile fails, the NRF does not store any information received in step 1, and the NRF can send the NF register response (at step 3) with a failure indication. The NF service producer can receive a success indication (at step 4), and if it also receives acceptable trust range(s) for the service(s) information, the NF service producer can update and store the acceptable trust range(s) for the service(s) information, which is used to limit the NF service consumers accordingly when a service is requested.

Notably, described aspects of FIGS. 2 and 3 may be applicable for a NF service consumer. For example, a NF service consumer can perform a registration and/or registration update based on the FIGS. 2 and 3 signaling (message flow) and, in this case, the description can be applied where the NF service consumer transmits a NF register request (step 1), receives a NF register response (step 3), and stores acceptable trust range(s) for the NF service consumer (e.g., performs step 4), where the terminology NF service producer is replaced with NF service consumer in the related procedure.

Further, described aspects of FIGS. 2 and 3 may be applicable for NF service discovery. For a NF service consumer that initiates a NF discovery procedure, then the signaling (message flow) will include a NF discovery request (at step 1), authorizing NF service discovery (at step 2), and a NF discovery response (at step 3). A NF service consumer transmits a NF discovery request (at step 1) with NF security state information, MAC/signature of the NF security state information, and a preferred or required trust range for the service(s). For example, the required trust range information will indicate trust level(s) for the type of NFs and NF service producers that are eligible for discovery and to offer service(s) to the NF service consumers.

The NRF verifies (at step 2) the NF security state and related MAC/signature specific to the NF service consumer, as similarly described for a NF registration. Further, based on local policy, the NRF can obtain the trust data as described in steps 2b and 2c of the FIG. 3 description related to the NF service consumer, and checks whether the NF service consumer is authorized to discover the requested NF service producers. The authorization of the NF service discovery can be provided based on any one or more validations, including if the trust evaluation information or data available in the NRF or obtained from the TESF, NWDAF, or any NF indicates that the trust range value(s) specific to the NF service consumer are acceptable for discovering any NF service producer, based on the access control policy and local policy available in the NRF; if the security monitoring data indicates that the security posture of the NF service consumer is valid; and/or if the NF service consumer's security state verification is successful.

The NRF transmits (at step 3) the NF discovery response with the discovered NF instances information if the NF service consumer's trust related validations are successful at step 2. If the NF service consumer's trust related validations are not successful at step 2, the NRF transmits the NF discovery response with an error code and a trust validation failure indication.

Figure 4:
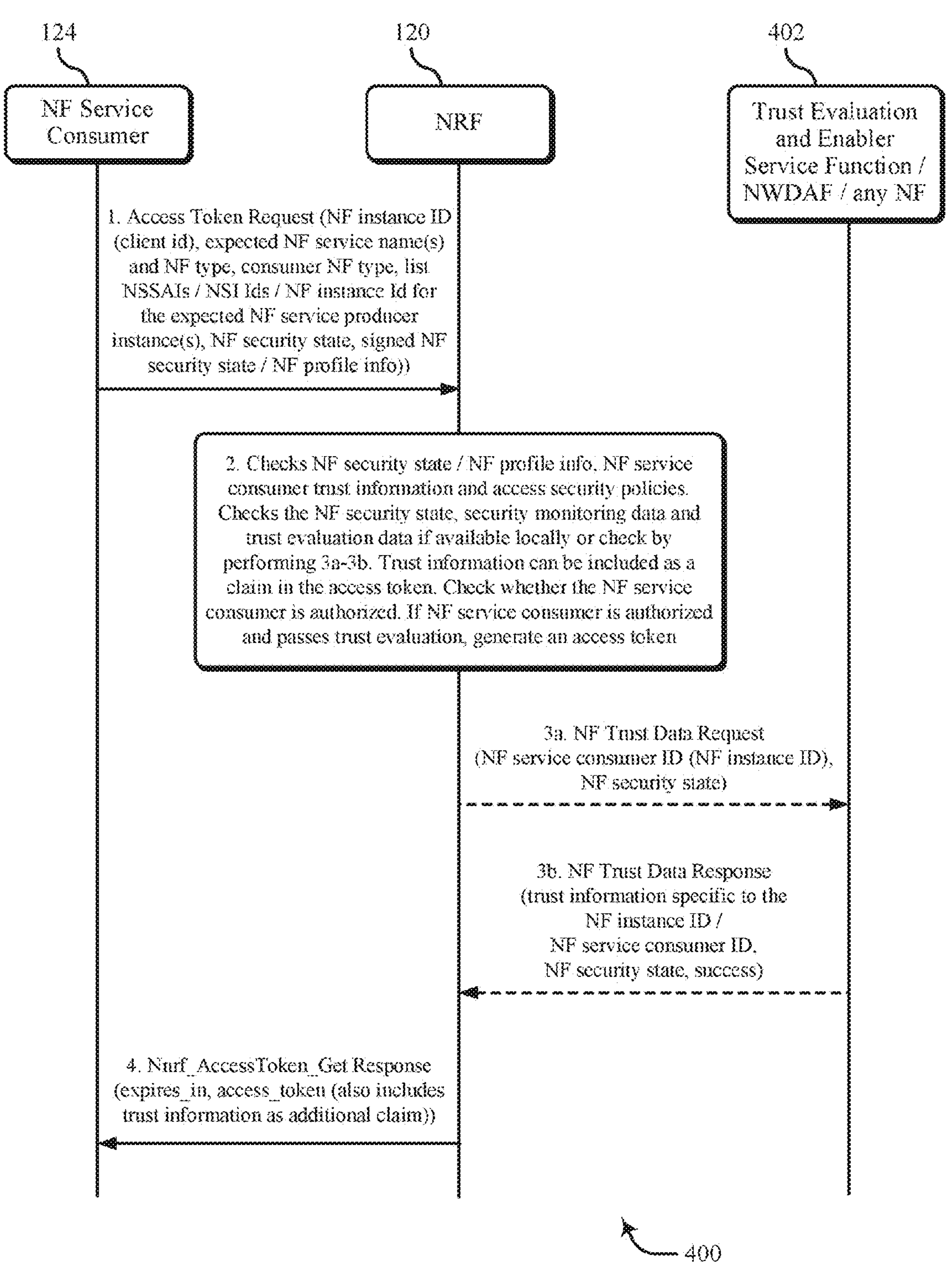

FIG. 4 illustrates an example of a signaling diagram 400 that supports security management of trusted network functions in accordance with aspects of the present disclosure. In a second implementation, NF service consumer trust information based access control can be enforced by the NRF when a NF service consumer requests an access token to consume any (or specific) NF service producer service(s). The NRF 120 authorizes and provides an access token to a NF service consumer 124 only after a successful validation of the NF service consumer's trust level and security state. The NF service consumer can already be registered with the NRF, using a NF registration procedure, such as described with reference to FIGS. 2 and 3.

The NF service consumer may request an access token (at step 1) from the NRF (e.g., using the Nnrf_AccessToken_Get request operation). The message may include NF service consumer identification information (such as NF instance ID), the requested scope which can include expected NF service name(s), a NF type of the expected NF service producer and NF service consumer, slice information (such as a list of network slice selection assistance information (NSSAIs) or network slice instance (NSI) IDs, NF set IDs) of the NF service producer, a list of S-NSSAIs of the NF service consumer, NF instance IDs of the requested NF service producer (if available), a NF security state (as a separate information element or as part of NF profile information), and a signed NF security state.

The NRF may verify (at step 2) that the input parameters (e.g., NF type) in the access token request match with the corresponding ones in the public key certificate of the NF service consumer or those in the NF profile of the NF service consumer. The NRF checks if the NF security state information that is received in step 1 (as a separate information element or as part of the NF profile) matches with the NF security state information of the NF service consumer stored in the NF profile, in the public key certificate, or is available locally as part of security monitoring data. If the signed NF security state information is received, the NRF verifies the signature using the public key of the NF service consumer or using a shared secret key. Based on the trust evaluation information (e.g., trust range value(s)) specific to the NF service consumer (if available), and access security policies, the NRF checks whether the NF service consumer is authorized to access the requested service(s). If the NF service consumer is authorized, the NRF can generate an access token with appropriate claims included. The NRF can digitally sign the generated access token based on a shared secret or private key. If the NF service consumer is not authorized, the NRF may not issue an access token to the NF service consumer.

As an alternative (at step 2), if the NRF 120 determines that trust evaluation information, security monitoring data, or security state information related to the NF service consumer is not locally available at the NRF, then the NRF may perform steps 3a and 3*b* to obtain NF service consumer specific trust data, along with security state information. In this implementation, based on the locally configured access security policies, the NRF determines whether the NF service consumer 124 with its evaluated trust information (e.g., trust range values) is authorized to consume the requested service(s). The access security policy information available at the NRF specifies if a specific trust range level(s) is authorized to consume any NF producer service or not. For example, if a NF service consumer is evaluated to have trust range values related to medium, high, or very high, it can be authorized to consume a NF producer service. However, if a NF service consumer is evaluated to have trust range values related to critical, very low, or low, it cannot be authorized to consume a NF producer service (and the NF service consumer cannot consume the NF producer service).

The access security policy or policies may include a list of NF IDs, NF instance IDs, NF types, a corresponding trust information set (e.g., trust range value(s)), security monitoring data (e.g., a security state of the NF), a service provision restriction list (e.g., if the NF is a service producer) or a service consumption restriction list (e.g., if the NF is a service consumer), and a resource access restriction list (e.g., general NF, NF service, a network data and UE data access restriction list). The NRF sends (at step 3a) a NF trust data request to the NF 402 (e.g., a NWDAF, TESF, or any NF) which implements NF trust evaluation, trust identification, and a security monitoring function or service. The NF trust data request can include a NF service consumer ID, such as a NF instance ID or a client ID, and if available, the NF security state information of the NF service consumer as received from the NF service consumer.

The NF 402 (e.g., a NWDAF, TESF, or any NF) which implements NF trust evaluation, trust identification, and a security monitoring function or service, obtains (at step 3b) the most recent trust evaluation information and/or trust data specific to the NF service consumer's instance ID, and provides the trust information (e.g., evaluated trust range value(s)) to the NRF in a NF trust data response message. If the NF 402 receives any NF security state information of the NF service consumer in step 3a, then the NF (e.g., a NWDAF, TESF, or any NF) can verify the received NF security state information with the locally managed NF security state information corresponding to the NF service consumer ID, and if the match is successful, the verification of the NF security state is considered successful. The NF trust data response message can also include a NF service consumer ID, an instance ID related to the trust information, and the verified NF service consumer's security state information, along with a success indication.

Figure 5:
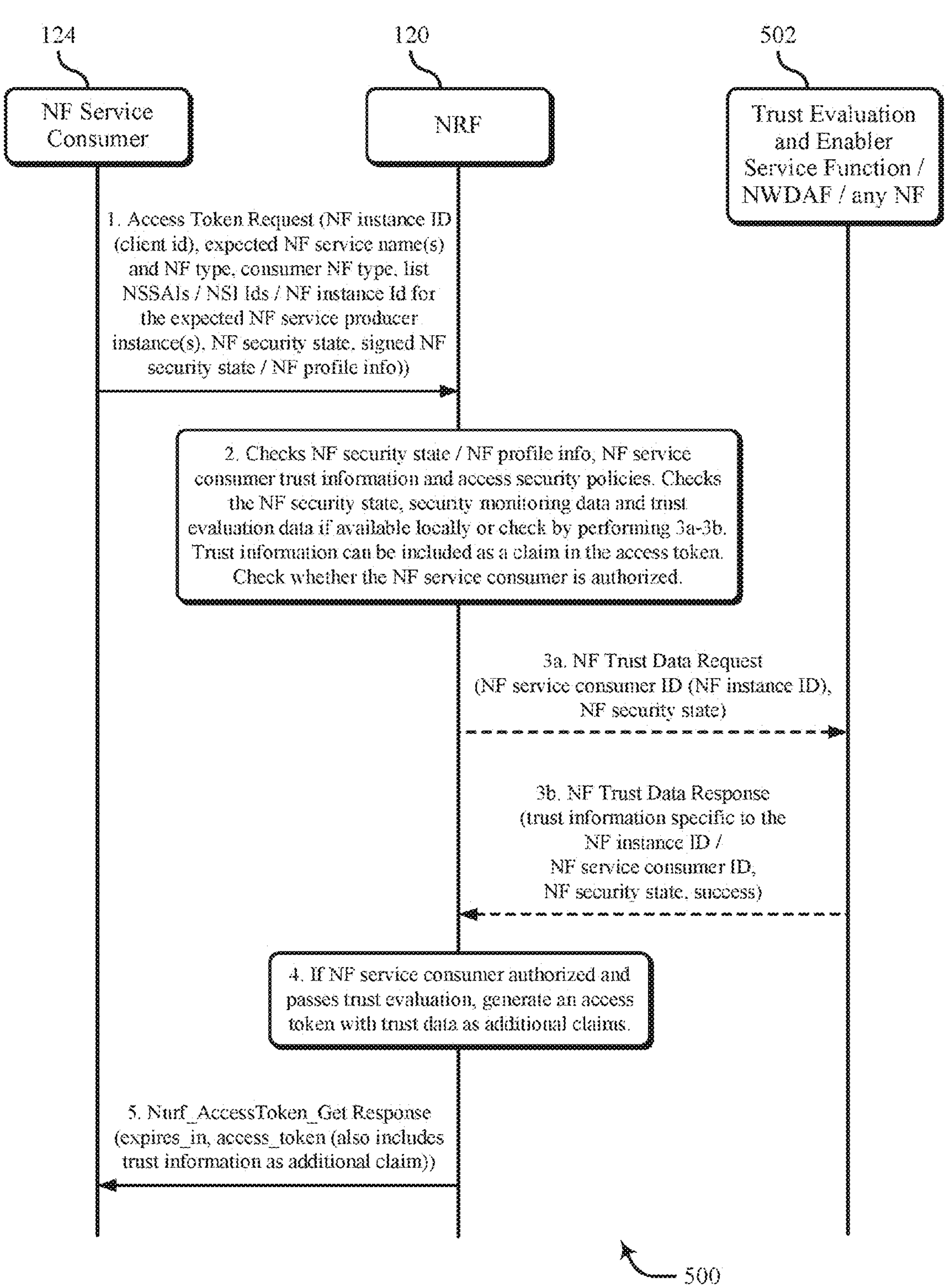

FIG. 5 illustrates an example of a signaling diagram 500 that supports security management of trusted network functions in accordance with aspects of the present disclosure. The signaling diagram 500 further illustrates aspects of the signaling diagram 400. If the NRF determines (at step 4) that the NF security state validation is successful and the trust information indicates acceptable or allowed trust ranges to offer the service, then the NRF determines to generate and provides the access token with the trust information to the NF service consumer. If the trust data verification/evaluation and authorization is successful, the NRF can transmit (at step 4, FIG. 4; at step 5, FIG. 5) the access token (e.g., with trust information specific claims) to the NF service consumer in a response message (e.g., the Nnrf_AccessToken_Get operation), otherwise it can reply with a suitable error response. Alternatively, if the evaluated trust data or information (e.g., the evaluated trust range value(s)) indicates any critical, very low, or low trust values, then the NRF determines not to provide any access token and sends an access token response with an error code specific to the trust failure.

The claims in the token can include the NF instance ID of the NRF (issuer), a NF instance ID of the NF service consumer (subject), a NF type of the NF service producer (audience), expected service name(s), evaluated trust range value(s), a NF security state as individual information element or as part of any scope information, an expiration time, and optionally additional scope information, such as allowed resources and allowed actions (e.g., service operations on the resources). The claims may include a list of NSSAIs or NSI IDs for the expected NF service producer instances. The claims may include the NF set ID of the expected NF service producer instances. In one or more implementations, a SCP may be implemented in FIGS. 4 and 5 between the NF service consumer 124 and the NRF 120 signaling (message flow) for alternative indirect communication. The trust data based access control can be considered as a risk based access control as applicable. The NF service consumer can digitally sign the NF profile based on a shared secret or private key.

Figure 6:
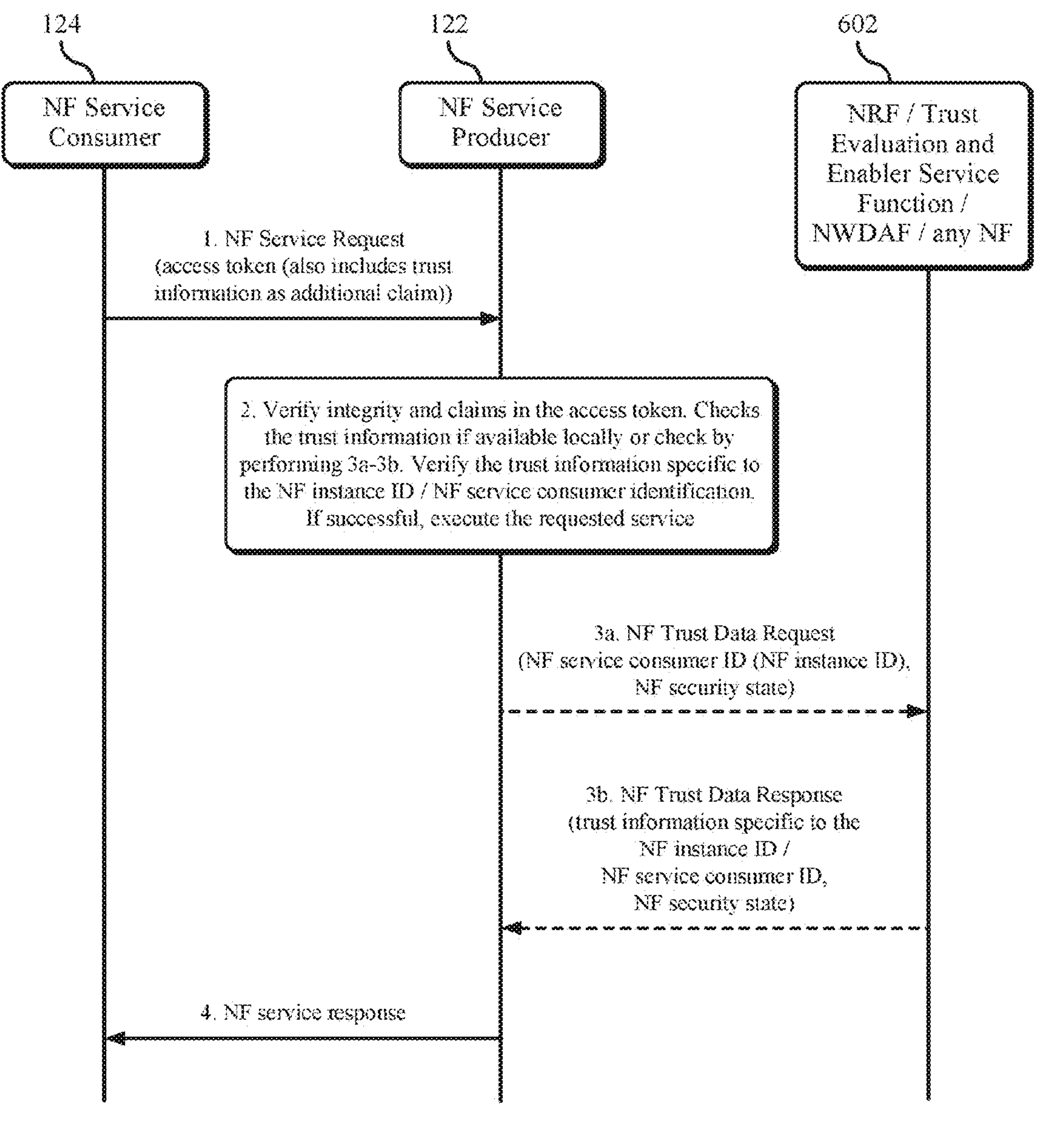

FIG. 6 illustrates an example of a signaling diagram 600 that supports security management of trusted network functions in accordance with aspects of the present disclosure. In this example, trust data based access is controlled by a NF service producer 122 for network service(s) access. In an implementation, the trust information of a NF service consumer 124 can be considered and validated to enforce access control by the NF service producer 122 when the NF service consumer requests any NF service producer service(s). In one or more implementations, a SCP may be implemented between the NF service consumer 124 and the NF service producer 122 signaling (message flow) for alternative indirect communication.

As a prerequisite, the NF service consumer is in possession of a valid access token before requesting service access from the NF service producer. As an option, the NF service consumer may obtain trust evaluation data specific to the NF service producer (by performing steps 3a and 3b using NF service producer identification information) before requesting services from any NF service producer, and if the returned trust level(s) of the NF service producer complies with the local configuration of the NF service consumer, then the NF service consumer may determine to request service from the trusted NF service producer (e.g., a trust data verified NF service producer). The NF service consumer requests service (at step 1) from the NF service producer with an NF service request that includes the access token, which has the trust information as an additional claim.

The NF service producer can verify the token (at step 2). The NF service producer ensures the integrity of the token by verifying the signature using the NRF's public key or checking the MAC value using the shared secret. If the integrity check is successful, the NF service producer can verify the claims in the token as follows: It checks that the audience claim in the access token matches its own identity or the type of NF service producer. If a list of NSSAIs or list of NSI IDs is present, the NF service producer can check that it serves the corresponding slice(s). If a NF set ID is present, the NF service producer can check whether the NF set ID in the claim matches its own NF set ID. If the scope is present, it checks that the scope matches the requested service operation. If the access token contains additional scope information (e.g., allowed resources and allowed actions (service operations) on the resources), it checks that the additional scope matches the requested service operation. It checks that the access token has not expired by verifying the expiration time in the access token against the current date and time. If the client credential assertion (CCA) is present in the service request, it may verify the CCA and that the subject claim (e.g., the NF instance ID of the NF service consumer) in the access token matches the subject claim in the CCA.

Additionally, if the trust information is present, the NF service producer can determine whether the trust information matches (e.g., evaluated trust range value(s) of NF service consumer) with the locally available or configured allowed trust range value(s) to offer the requested NF producer services or access security policies. If the trust information match is successful, then the verification (e.g., trust information) is considered successful. Further if the trust information received in step 1 also includes a NF security state of the NF service consumer, and if the NF service producer does not have information to validate the NF security state, then the NF service producer verifies the NF security state by performing steps 3a and 3b. The access security policy or policies may include a list of NF IDs, NF instance IDs, NF type(s), a corresponding trust information set (e.g., trust range value(s)), security monitoring data (e.g., a security state of the NF), a service provision restriction list (e.g., if the NF is a service producer) or a service consumption restriction list (e.g., if the NF is a service consumer), and a resource access restriction list (e.g., general NF, NF service, a network data and UE data access restriction list).

The NF service producer (at step 3a) sends a NF trust data request to the NRF or to the NF 602 (e.g., a NWDAF, TESF, or any NF) which implements NF trust evaluation, trust identification, and/or a security monitoring function or service. The NF trust data request can include a NF service consumer ID, such as a NF instance ID or a client ID, and if available, the NF security state information of the NF service consumer. The NRF or NF 602 (at step 3b), if the NF is a NWDAF, TESF, or any NF that implements NF trust evaluation, trust identification and/or a security monitoring function or service, it obtains the most recent trust evaluation information or trust data specific to the NF service consumer's instance ID and provides the trust information (e.g., evaluated trust range value(s)) to the NF service producer in a NF trust data response message. If the NF receives NF security state information of the NF service consumer in step 3a, then the NF (e.g., a NWDAF, TESF, or any NF) can verify the received NF security state information with the locally managed NF security state information corresponding to the NF service consumer ID, and if the match is successful, the verification of the NF security state is considered successful. The NF trust data response message can also include a NF service consumer ID and/or instance ID related to the trust information, and the verified NF service consumer's security state information, along with a success indication.

Alternatively, if the NF is the NRF, it obtains the NF security state of the NF service consumer corresponding to the NF service consumer identification information and verifies whether the received NF security state matches with the locally stored NF security state information for the NF service consumer. If the match is successful, then the verification of the NF security state is considered successful. The NF trust data response message can also include a NF service consumer ID or instance ID related to the trust information and the verified NF service consumer's security state information, along with a success indication. As an alternative, if the verification at step 3b is not successful, then a trust failure indication is sent in the NF trust data response message. If the verification is successful, then the NF service producer (at step 4) can execute the requested service and responds back to the NF service consumer. Otherwise, it can send an error response with a trust failure indication.

In aspects of security management of trusted network functions, an implementation enhances the CCA to support client trust information based authentication. The CCA is a token signed by the NF service consumer. It enables the NF service consumer to authenticate towards the receiving end point (NRF, NF service producer) by including the signed token in a service request. It includes the NF service consumer's NF instance ID that can be checked against the certificate by the NF service producer. The CCA includes a timestamp as basis for restriction of its lifetime. The CCAs are expected to be more short-lived than NRF generated access tokens, so they can be used in deployments with requirements for tokens with shorter lifetime for NF-NF communication. There is a trade-off that when the lifetime of the CCA is too short, it requires the NF service consumer to generate a new CCA for every new service request.

The CCA may not be used in the roaming case, as the NF service producer in the home public land mobile network (PLMN) may not be able to verify the signature of the NF service consumer in the visited PLMN unless cross-certification process is established between the two PLMNs. In this implementation, CCAs are described generally for both NF-NRF communication and NF-NF communication. With reference to client credentials assertion, CCAs can be JavaScript object notation (JSON) Web Tokens and are secured with digital signatures based on JSON web signature (JWS).

The CCA can include the NF instance ID of the NF service consumer (subject); a timestamp and an expiration time; NF security state information; NF trust related information (e.g., trust range value(s)) for the expected services; and the NF type of the expected audience (e.g., the NRF type and/or the NF type of the NF service producer). The NF service consumer can digitally sign the generated CCA based on its private key. The signed CCA can include one of the following fields: the X.509 URL (x5u) to refer to a resource for the X.509 public key certificate or certificate chain used for signing the client authentication assertion, or the X.509 certificate chain (x5c) includes the X.509 public key certificate or certificate chain used for signing the client authentication assertion.

The verification of the CCA can be performed by the receiving node, such as the NRF or NF service producer in various ways, such as validating the signature of the JWS and/or validating the timestamp and/or the expiration time. If the receiving node is the NRF, the NRF validates the timestamp and the expiration time. If the receiving node is the NF service producer, the NF service producer validates the expiration time and it may validate the timestamp. It checks that the audience claim in the CCA matches its own type. It verifies that the NF instance ID of the NF in the CCA matches the NF instance ID in the public key certificate used for signing the CCA. If the receiving node is the NRF, then it checks the NF security state of the NF service consumer specific to the NF instance ID, and if the receiving node is the NF service producer, then it checks the NF security state of the NF service consumer specific to the NF instance ID as follows.

The NRF/NF service producer (in a step A.) sends a NF trust data request to the NF (e.g., a NWDAF, TESF, or any NF) which implements NF trust evaluation, trust identification, and/or a security monitoring function or service. The NF trust data request can include a NF service consumer ID (such as a NF instance ID or client ID) and if available, the NF security state information of the NF service consumer. The NF (e.g., a NWDAF, TESF, or any NF), which implements NF trust evaluation, trust identification, and/or a security monitoring function or service, obtains (at step B.) the most recent trust evaluation information and/or trust data specific to the NF service consumer's instance ID, and provides the trust information (e.g., evaluated trust range value(s)) to the NRF in a NF trust data response message. If the NF receives any NF security state information of the NF service consumer in step 3a, then the NF (e.g., a NWDAF, TESF, or any NF) can verify the received NF security state information with the locally managed NF security state information corresponding to the NF service consumer ID, and if the match is successful, the verification of the NF security state is considered successful.

The NF trust data response message can also include a NF service consumer ID and/or an instance ID related to the trust information and the verified NF service consumer's security state information, along with a success indication. If the NF security state doesn't match the data available in the NF (e.g., a NWDAF, TESF, or any NF) and/or if the trust evaluation information falls below any critical threshold, then a trust failure indication is sent to the NRF/NF service producer which initiated the above step A. It checks the NF trust related information (e.g., trust range value(s)) for the expected services, based on the access security policies locally configured. The access security policy or policies may include a list of NF IDs, NF instance IDs, NF type(s), a corresponding trust information set (e.g., trust range value(s)), a service provision restriction list (e.g., corresponding to the NF service producer) or a service consumption restriction list (e.g., corresponding to the NF service consumer) and a resource access restriction list.

Aspects of security management of trusted network functions, as described herein, are applicable for a NF service producer, for the NF service producer registration update procedure, and/or applied for the NF service consumer registration procedure and its related registration update procedure. In implementations, the NF service producer (e.g., any NF) sends a request to a NRF with any one or more of a NF type, a NF ID, a NF profile, NF security state information, a signature of NF security state information, a message authentication code of NF security state information, and/or required trust range(s) information for the services. The NRF verifies the NF security state information; determines the acceptable or allowed trust range(s) for the services and access security policies; and stores one or more of the NF security state information, the NF profile, and the acceptable or allowed trust range(s) for the services and access security policies. The NF service producer receives a response from the NRF with a result success and/or acceptable trust range(s) for the services.

The required trust range information can contain one or more values or information to indicate the trustworthiness of the network function service consumers to be authorized to request services (by the NRF), request and consume the offered services. The allowed or acceptable trust range information can contain one or more values or information to indicate the trustworthiness of the network function service consumers to request and consume the offered services from the NRF service producer. The NF service producer, on receiving the allowed or acceptable trust range information, stores the allowed or acceptable trust range information for the services.

The NRF can verify the NF security state information based on one or more of locally stored NF security state information related to the NF instance ID, NF ID, or NF certificate, by requesting a NF that performs trust evaluation. The NRF can verify the NF security state information by checking if the received NF security state information matches with the managed NF security state information for a specific NF identified with a NF type, a NF ID, and/or a NF instance ID. The NRF can verify the NF security state information and/or trust level of the NF service producer by checking with a NF that performs trust evaluation and security monitoring service. The NRF can verify the NF security state information by determining whether the received NF security state information matches with the required NF security state information for a specific NF identified with NF Type, NF ID, or NF instance ID locally configured at the NRF. If the verification of the NF security state information fails, the NRF sends a response to the NF service producer with one or more of a failure indication, an error code, and/or trust validation failure information. The access security policy or policies can include a list of one or more of NF IDs, NF instance IDs, NF type(s), a corresponding trust information set (e.g., trust range value(s)), security monitoring data (e.g., a security state of the NF), a service provision restriction list (e.g., if the NF is a service producer) or a service consumption restriction list (e.g., if the NF is a service consumer), and/or a resource access restriction list (e.g., general NF, NF service, a network data and UE data access restriction list).

Figure 7:
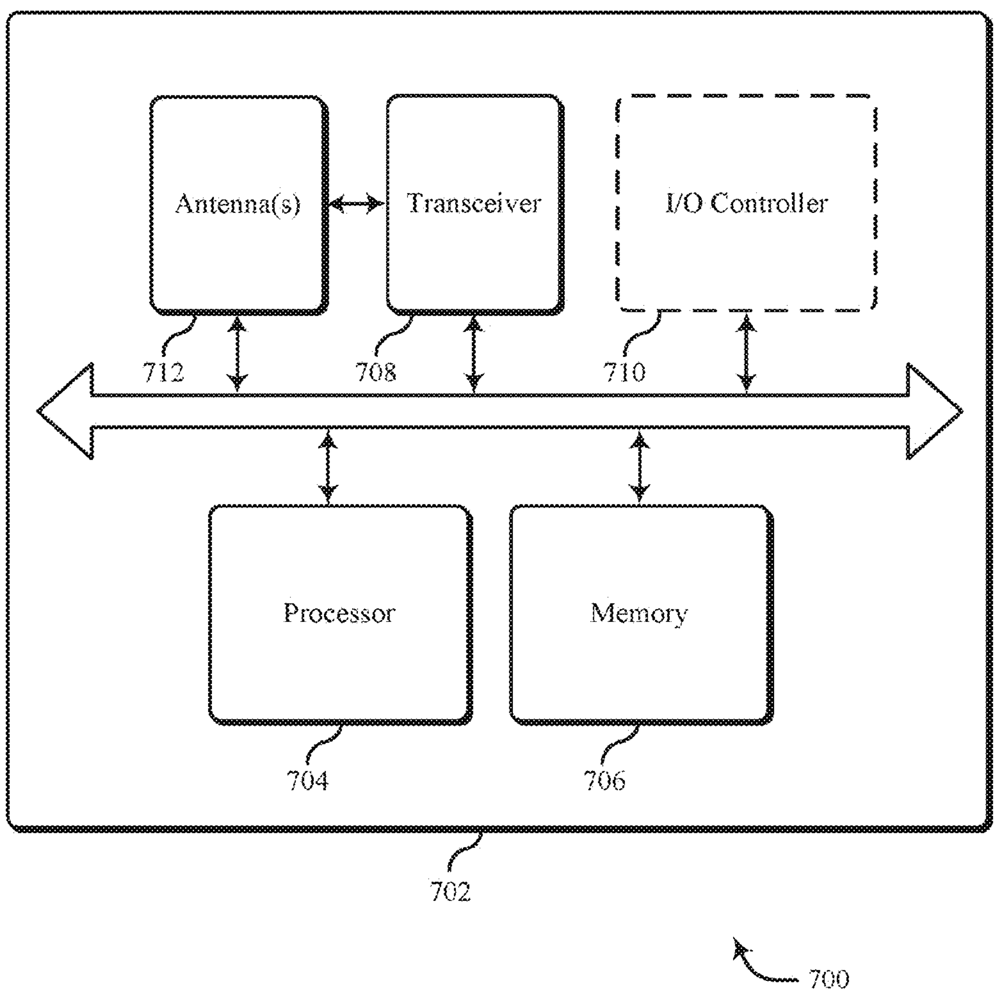
FIGS. 7 and 8 illustrate an example of a block diagram of devices that support security management of trusted network functions in accordance with aspects of the present disclosure.

FIG. 7 illustrates an example of a block diagram 700 of a device 702 that supports security management of trusted network functions in accordance with aspects of the present disclosure. The device 702 may be an example of device that implements a NRF 120 as described herein. The device 702 may support wireless communication with one or more network entities 102, UEs 104, or any combination thereof. The device 702 may include components for bi-directional communications including components for transmitting and receiving communications, such as a processor 704, a memory 706, a transceiver 708, and an I/O controller 710. These components may be in electronic communication or otherwise coupled (e.g., operatively, communicatively, functionally, electronically, electrically) via one or more interfaces (e.g., buses).

The processor 704, the memory 706, the transceiver 708, or various combinations thereof or various components thereof may be examples of means for performing various aspects of the present disclosure as described herein. For example, the processor 704, the memory 706, the transceiver 708, or various combinations or components thereof may support a method for performing one or more of the operations described herein.

In some implementations, the processor 704, the memory 706, the transceiver 708, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some implementations, the processor 704 and the memory 706 coupled with the processor 704 may be configured to perform one or more of the functions described herein (e.g., executing, by the processor 704, instructions stored in the memory 706).

For example, the processor 704 may support wireless communication at the device 702 in accordance with examples as disclosed herein. The processor 704 may be configured as or otherwise support a means for receiving a first signaling as a NF request from a NF, the NF request including at least a NF type, a NF ID, and NF security state information; verifying a NF security state based at least in part on the NF ID and the NF security state information; and transmitting a second signaling as a NF response, the NF response including a security verification of the NF request.

Additionally, the processor 704 may be configured as or otherwise support any one or combination of enforcing access control security policies for services associated with the NF. The method further comprising generating the access control security policies for the services associated with the NF. The method further comprising generating the access control security policies based on at least one or more of an established policy, NF profile information, the NF security state information, or an allowed trust level for the services associated with the NF. The method further comprising enforcing the access control security policies based at least in part on allowed trust range values for a NF service consumer to consume the services associated with the NF; and transmitting a third signaling as the allowed trust range values to a NF service producer to allow the NF service consumer with the allowed trust range values to consume the services associated with the NF. The NF response includes one or more allowed trust levels for services associated with the NF. The method further comprising allocating the one or more allowed trust levels for the services associated with the NF based at least in part on established policy, NF trust information, and NF security data. The NF request includes a NF profile, an authentication code, and an indication of a trust level for services associated with the NF. The NF security state information is part of the NF profile. The NF is a NF service producer, and the authentication code of the NF security state information is generated by the NF service producer with a private key or a shared secret key of the NF service producer. The NF is a NF service consumer, and the authentication code of the NF security state information is generated by the NF service consumer with a private key or a shared secret key of the NF service consumer. The method further comprising verifying the NF security state information by verifying the authentication code of the NF security state information using a public key or a shared secret key. The method further comprising verifying the NF security state information by matching the NF ID or a NF instance ID corresponding to stored NF security state information associated with the NF. The method further comprising storing a NF profile of the NF, the NF profile including at least the NF ID, the stored NF security state information associated with the NF, and trust evaluation information associated with the NF. Access control security policies for services associated with the NF include an allowed trust level for services associated with the NF and at least one of a service provision restriction list, a service consumption restriction list, or a resource access restriction list. The NF request is received as a NF registration request from the NF; and the NF response is transmitted as a NF registration response to the NF. The NF request is received as a NF registration update request from the NF; and the NF response is transmitted as a NF registration update response to the NF. The NF request is received as a NF discovery request from the NF; and the NF response is transmitted as a NF discovery response to the NF.

Additionally, or alternatively, the device 702, in accordance with examples as disclosed herein, may include a processor; a transceiver coupled with the processor; and a memory coupled with the processor, the processor and the transceiver configured to: receive a first signaling as a NF request from a NF, the NF request including at least a NF type, a NF ID, and NF security state information; verify a NF security state based at least in part on the NF ID and the NF security state information; and transmit a second signaling as a NF response, the NF response including a security verification of the NF request.

Additionally, the wireless communication at the device 702 may include any one or combination of the processor is configured to enforce access control security policies for services associated with the NF. The processor is configured to generate the access control security policies for the services associated with the NF. The processor is configured to generate the access control security policies based on at least one or more of an established policy, NF profile information, the NF security state information, or an allowed trust level for the services associated with the NF. The processor is configured to enforce the access control security policies based at least in part on allowed trust range values for a NF service consumer to consume the services associated with the NF; and transmit a third signaling as the allowed trust range values to a NF service producer to allow the NF service consumer with the allowed trust range values to consume the services associated with the NF. The NF response includes one or more allowed trust levels for services associated with the NF. The processor is configured to allocate the one or more allowed trust levels for the services associated with the NF based at least in part on established policy, NF trust information, and NF security data. The NF request includes a NF profile, an authentication code, and an indication of a trust level for services associated with the NF. The NF security state information is part of the NF profile. The NF is a NF service producer, and the authentication code of the NF security state information is generated by the NF service producer with a private key or a shared secret key of the NF service producer. The NF is a NF service consumer, and the authentication code of the NF security state information is generated by the NF service consumer with a private key or a shared secret key of the NF service consumer. The processor is configured to verify the NF security state information by verifying the authentication code of the NF security state information using a public key or a shared secret key. The processor is configured to verify the NF security state information by matching the NF ID or a NF instance ID corresponding to stored NF security state information associated with the NF. The processor is configured to store a NF profile of the NF, the NF profile including at least the NF ID, the stored NF security state information associated with the NF, and trust evaluation information associated with the NF. Access control security policies for services associated with the NF include an allowed trust level for services associated with the NF and at least one of a service provision restriction list, a service consumption restriction list, or a resource access restriction list. The NF request is received as a NF registration request from the NF; and the NF response is transmitted as a NF registration response to the NF. The NF request is received as a NF registration update request from the NF; and the NF response is transmitted as a NF registration update response to the NF. The NF request is received as a NF discovery request from the NF; and the NF response is transmitted as a NF discovery response to the NF.

For example, the processor 704 may support wireless communication at the device 702 in accordance with examples as disclosed herein. The processor 704 may be configured as or otherwise support a means for receiving a first signaling as an access token request from a NF service consumer, the access token request including at least NF profile information and NF security state information; authorizing the NF service consumer based at least in part on the NF profile information and the NF security state information; and transmitting a second signaling as an access token response to the NF service consumer, the access token response including an access token.

Additionally, the processor 704 may be configured as or otherwise support any one or combination of generating the access token allowing the NF service consumer to access a service associated with a NF service producer. The NF service consumer is authorized based at least in part on access control security policies. The NF service consumer is authorized based at least in part on stored trust evaluation data. The authorizing the NF service consumer further comprises transmitting a NF trust request to a trust evaluation service, the NF trust request including at least a NF ID of the NF service consumer and the NF security state information; and receiving a NF trust response from the trust evaluation service, the NF trust response including a trust verification of the NF service consumer. The access token includes NF trust information associated with the NF service consumer. The NF profile information and the NF security state information is digitally signed by the NF service consumer with a private key or a shared secret key of the NF service consumer.

Additionally, or alternatively, the device 702, in accordance with examples as disclosed herein, may include a processor; a transceiver coupled with the processor; and a memory coupled with the processor, the processor and the transceiver configured to: receive a first signaling as an access token request from a NF service consumer, the access token request including at least NF profile information and NF security state information; authorize the NF service consumer based at least in part on the NF profile information and the NF security state information; and transmit a second signaling as an access token response to the NF service consumer, the access token response including an access token.

Additionally, the wireless communication at the device 702 may include any one or combination of the processor is configured to generate the access token allowing the NF service consumer to access a service associated with a NF service producer. The processor is configured to authorize the NF service consumer based at least in part on access control security policies. The processor is configured to authorize the NF service consumer based at least in part on trust evaluation data stored by the apparatus. To authorize the NF service consumer, the processor is configured to transmit a NF trust request to a trust evaluation service, the NF trust request including at least a NF ID of the NF service consumer and the NF security state information; and receive a NF trust response from the trust evaluation service, the NF trust response including a trust verification of the NF service consumer. The access token includes NF trust information associated with the NF service consumer. The NF profile information and the NF security state information is digitally signed by the NF service consumer with a private key or a shared secret key of the NF service consumer.

The processor 704 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some implementations, the processor 704 may be configured to operate a memory array using a memory controller. In some other implementations, a memory controller may be integrated into the processor 704. The processor 704 may be configured to execute computer-readable instructions stored in a memory (e.g., the memory 706) to cause the device 702 to perform various functions of the present disclosure.

The memory 706 may include random access memory (RAM) and read-only memory (ROM). The memory 706 may store computer-readable, computer-executable code including instructions that, when executed by the processor 704 cause the device 702 to perform various functions described herein. The code may be stored in a non-transitory computer-readable medium such as system memory or another type of memory. In some implementations, the code may not be directly executable by the processor 704 but may cause a computer (e.g., when compiled and executed) to perform functions described herein. In some implementations, the memory 706 may include, among other things, a basic I/O system (BIOS) which may control basic hardware or software operation such as the interaction with peripheral components or devices.

The I/O controller 710 may manage input and output signals for the device 702. The I/O controller 710 may also manage peripherals not integrated into the device M02. In some implementations, the I/O controller 710 may represent a physical connection or port to an external peripheral. In some implementations, the I/O controller 710 may utilize an operating system such as iOS®, ANDROID®, MS-DOS®, MS-WINDOWS®, OS/2®, UNIX®, LINUX®, or another known operating system. In some implementations, the I/O controller 710 may be implemented as part of a processor, such as the processor 704. In some implementations, a user may interact with the device 702 via the I/O controller 710 or via hardware components controlled by the I/O controller 710.

In some implementations, the device 702 may include a single antenna 712. However, in some other implementations, the device 702 may have more than one antenna 712 (e.g., multiple antennas), including multiple antenna panels or antenna arrays, which may be capable of concurrently transmitting or receiving multiple wireless transmissions. The transceiver 708 may communicate bi-directionally, via the one or more antennas 712, wired, or wireless links as described herein. For example, the transceiver 708 may represent a wireless transceiver and may communicate bi-directionally with another wireless transceiver. The transceiver 708 may also include a modem to modulate the packets, to provide the modulated packets to one or more antennas 712 for transmission, and to demodulate packets received from the one or more antennas 712.

Figure 8:
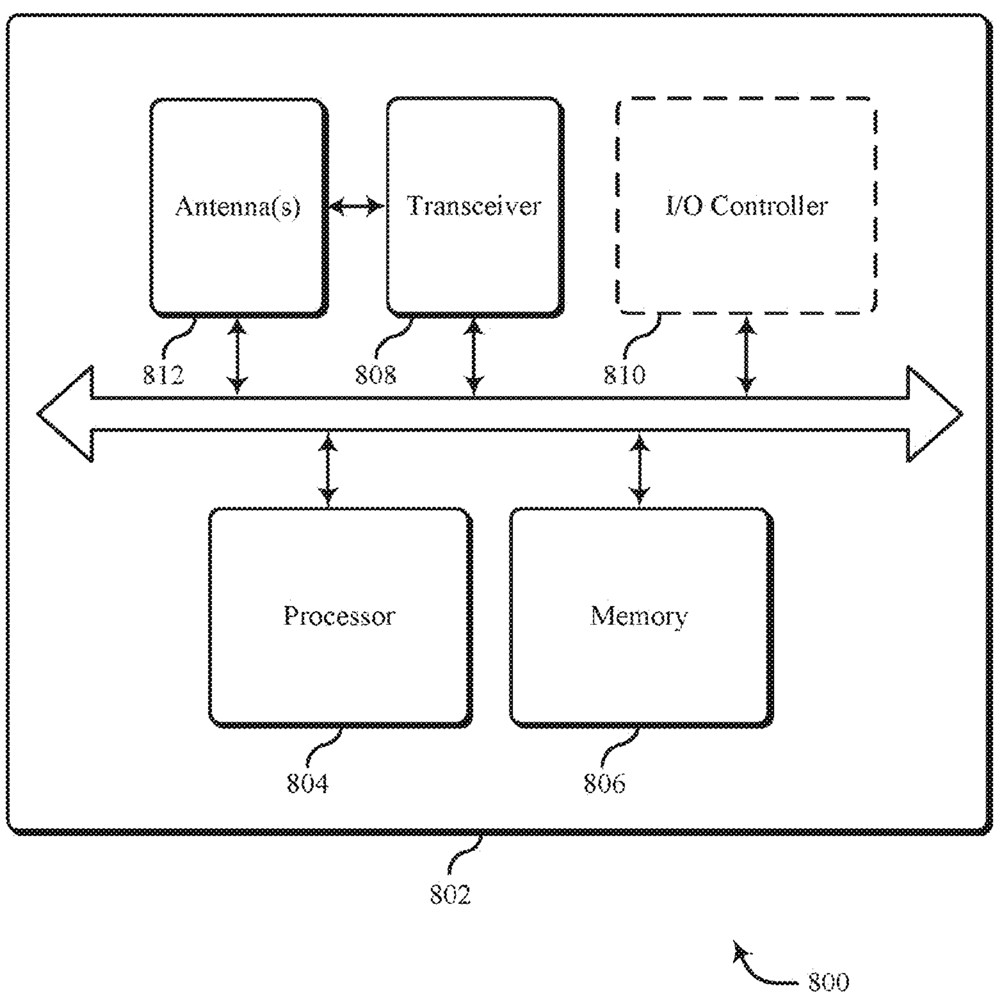

FIG. 8 illustrates an example of a block diagram 800 of a device 802 that supports security management of trusted network functions in accordance with aspects of the present disclosure. The device 802 may be an example of device that implements a NF service producer 122 and/or a NF service consumer 124 as described herein. The device 802 may support wireless communication with one or more network entities 102, UEs 104, or any combination thereof. The device 802 may include components for bi-directional communications including components for transmitting and receiving communications, such as a processor 804, a memory 806, a transceiver 808, and an I/O controller 810. These components may be in electronic communication or otherwise coupled (e.g., operatively, communicatively, functionally, electronically, electrically) via one or more interfaces (e.g., buses).

The processor 804, the memory 806, the transceiver 808, or various combinations thereof or various components thereof may be examples of means for performing various aspects of the present disclosure as described herein. For example, the processor 804, the memory 806, the transceiver 808, or various combinations or components thereof may support a method for performing one or more of the operations described herein.

In some implementations, the processor 804, the memory 806, the transceiver 808, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some implementations, the processor 804 and the memory 806 coupled with the processor 804 may be configured to perform one or more of the functions described herein (e.g., executing, by the processor 804, instructions stored in the memory 806).

For example, the processor 804 may support wireless communication at the device 802 in accordance with examples as disclosed herein. The processor 804 may be configured as or otherwise support a means for receiving a first signaling as a NF service request from a NF service consumer, the NF service request including at least a NF ID of the NF service consumer and an access token with NF trust information; verifying the NF trust information associated with the NF ID allowing a requested service of the NF service request; and transmitting a second signaling as a NF service response to the NF service consumer.

Additionally, the processor 804 may be configured as or otherwise support any one or combination of executing the requested service for the NF service consumer. The method further comprising verifying the NF service request based at least in part on access control security policies. The method further comprising authorizing the NF service request based at least in part on trust evaluation data stored by the apparatus. The verifying the NF trust information further comprises transmitting a NF trust request to a trust evaluation service, the NF trust request including at least the NF ID of the NF service consumer and the NF trust information; and receiving a NF trust response from the trust evaluation service, the NF trust response including a trust verification of the NF service request. The trust evaluation service is at least one of a NRF, a NWDAF, or a TESF.

Additionally, or alternatively, the device 802, in accordance with examples as disclosed herein, may include a processor; a transceiver coupled with the processor; and a memory coupled with the processor, the processor and the transceiver configured to: receive a first signaling as a NF service request from a NF service consumer, the NF service request including at least a NF identifier ID of the NF service consumer and an access token with NF trust information; verify the NF trust information associated with the NF ID allowing a requested service of the NF service request; and transmit a second signaling as a NF service response to the NF service consumer.

Additionally, the wireless communication at the device 802 may include any one or combination of the processor is configured to execute the requested service for the NF service consumer. The processor is configured to verify the NF service request based at least in part on access control security policies. The processor is configured to authorize the NF service request based at least in part on trust evaluation data stored by the apparatus. To verify the NF service request, the processor is configured to transmit a NF trust request to a trust evaluation service, the NF trust request including at least the NF ID of the NF service consumer and the NF trust information; and receive a NF trust response from the trust evaluation service, the NF trust response including a trust verification of the NF service request. The trust evaluation service is at least one of a NRF, a NWDAF, or a TESF.

The processor 804 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some implementations, the processor 804 may be configured to operate a memory array using a memory controller. In some other implementations, a memory controller may be integrated into the processor 804. The processor 804 may be configured to execute computer-readable instructions stored in a memory (e.g., the memory 806) to cause the device 802 to perform various functions of the present disclosure.

The memory 806 may include random access memory (RAM) and read-only memory (ROM). The memory 806 may store computer-readable, computer-executable code including instructions that, when executed by the processor 804 cause the device 802 to perform various functions described herein. The code may be stored in a non-transitory computer-readable medium such as system memory or another type of memory. In some implementations, the code may not be directly executable by the processor 804 but may cause a computer (e.g., when compiled and executed) to perform functions described herein. In some implementations, the memory 806 may include, among other things, a basic I/O system (BIOS) which may control basic hardware or software operation such as the interaction with peripheral components or devices.

The I/O controller 810 may manage input and output signals for the device 802. The I/O controller 810 may also manage peripherals not integrated into the device M02. In some implementations, the I/O controller 810 may represent a physical connection or port to an external peripheral. In some implementations, the I/O controller 810 may utilize an operating system such as iOS®, ANDROID®, MS-DOS®, MS-WINDOWS®, OS/2®, UNIX®, LINUX®, or another known operating system. In some implementations, the I/O controller 810 may be implemented as part of a processor, such as the processor 804. In some implementations, a user may interact with the device 802 via the I/O controller 810 or via hardware components controlled by the I/O controller 810.

In some implementations, the device 802 may include a single antenna 812. However, in some other implementations, the device 802 may have more than one antenna 812 (e.g., multiple antennas), including multiple antenna panels or antenna arrays, which may be capable of concurrently transmitting or receiving multiple wireless transmissions. The transceiver 808 may communicate bi-directionally, via the one or more antennas 812, wired, or wireless links as described herein. For example, the transceiver 808 may represent a wireless transceiver and may communicate bi-directionally with another wireless transceiver. The transceiver 808 may also include a modem to modulate the packets, to provide the modulated packets to one or more antennas 812 for transmission, and to demodulate packets received from the one or more antennas 812.

Figure 9:
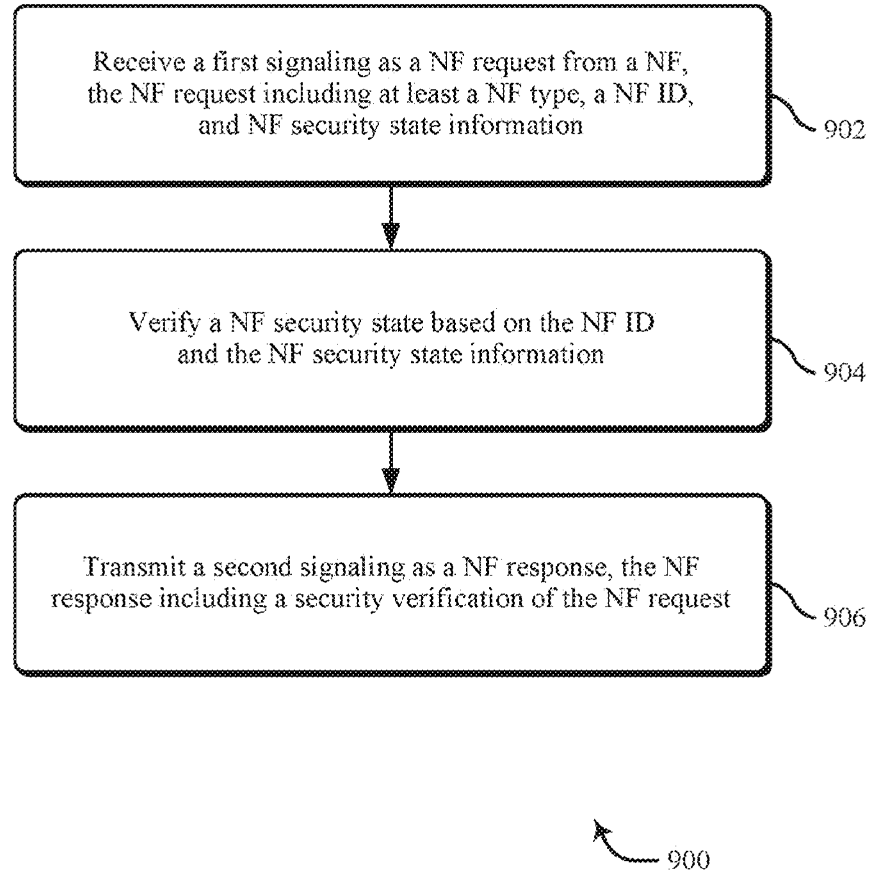
FIGS. 9 through 14 illustrate flowcharts of methods that support security management of trusted network functions in accordance with aspects of the present disclosure.

FIG. 9 illustrates a flowchart of a method 900 that supports security management of trusted network functions in accordance with aspects of the present disclosure. The operations of the method 900 may be implemented by a device or its components as described herein. For example, the operations of the method 900 may be performed by a NRF as described with reference to FIGS. 1 through 8. In some implementations, the device may execute a set of instructions to control the function elements of the device to perform the described functions. Additionally, or alternatively, the device may perform aspects of the described functions using special-purpose hardware.

At 902, the method may include receiving a first signaling as a NF request from a NF, the NF request including at least a NF type, a NF ID, and NF security state information. The operations of 902 may be performed in accordance with examples as described herein. In some implementations, aspects of the operations of 902 may be performed by a device as described with reference to FIG. 1.

At 904, the method may include verifying a NF security state based at least in part on the NF ID and the NF security state information. The operations of 904 may be performed in accordance with examples as described herein. In some implementations, aspects of the operations of 904 may be performed by a device as described with reference to FIG. 1.

At 906, the method may include transmitting a second signaling as a NF response, the NF response including a security verification of the NF request. The operations of 906 may be performed in accordance with examples as described herein. In some implementations, aspects of the operations of 906 may be performed by a device as described with reference to FIG. 1.

Figure 10:
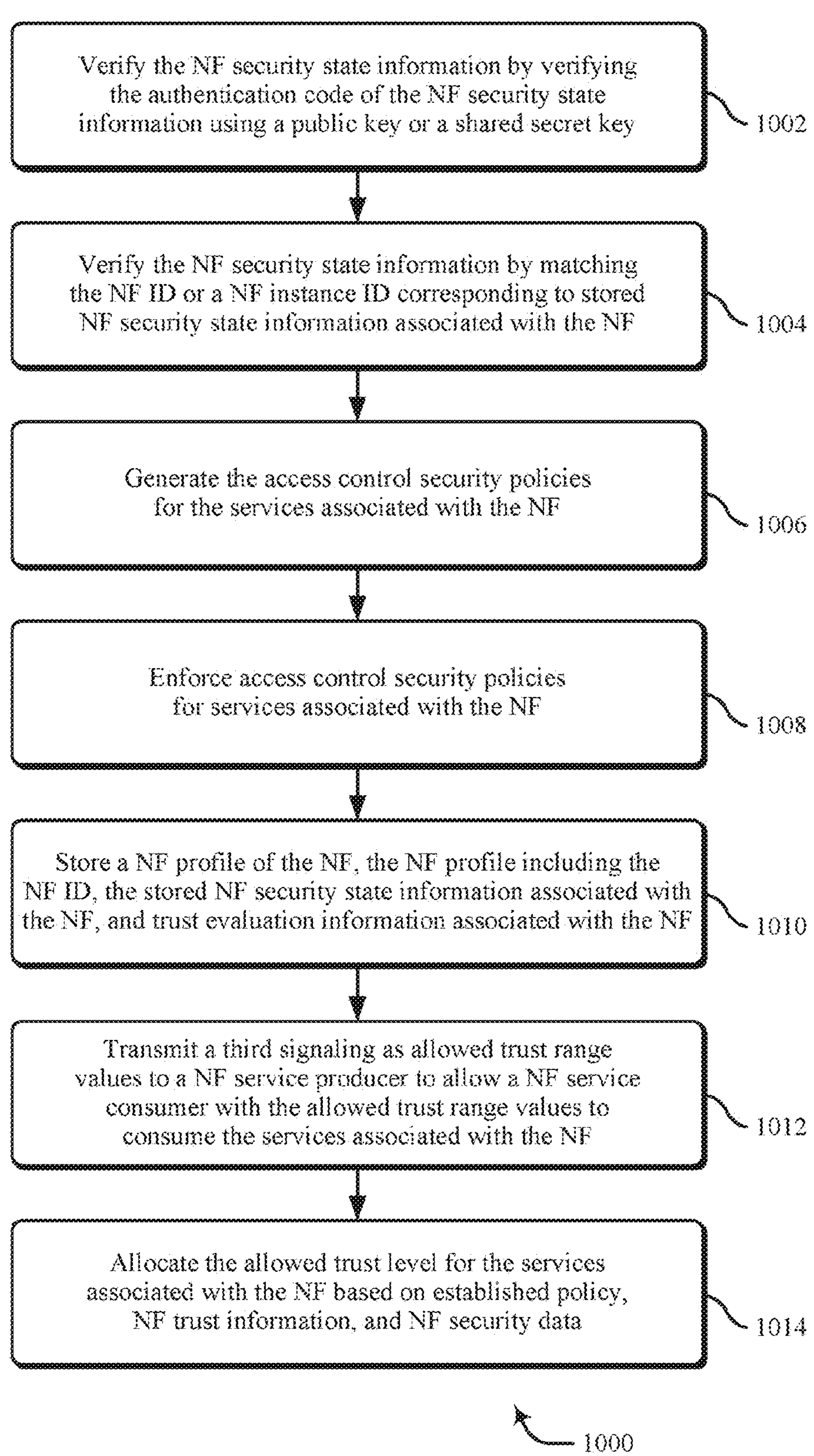

FIG. 10 illustrates a flowchart of a method 1000 that supports security management of trusted network functions in accordance with aspects of the present disclosure. The operations of the method 1000 may be implemented by a device or its components as described herein. For example, the operations of the method 1000 may be performed by a NRF as described with reference to FIGS. 1 through 8. In some implementations, the device may execute a set of instructions to control the function elements of the device to perform the described functions. Additionally, or alternatively, the device may perform aspects of the described functions using special-purpose hardware.

At 1002, the method may include verifying the NF security state information by verifying the authentication code of the NF security state information using a public key or a shared secret key. The operations of 1002 may be performed in accordance with examples as described herein. In some implementations, aspects of the operations of 1002 may be performed by a device as described with reference to FIG. 1.

At 1004, the method may include verifying the NF security state information by matching the NF ID or a NF instance ID corresponding to stored NF security state information associated with the NF. The operations of 1004 may be performed in accordance with examples as described herein. In some implementations, aspects of the operations of 1004 may be performed by a device as described with reference to FIG. 1.

At 1006, the method may include generating the access control security policies for the services associated with the NF. The operations of 1006 may be performed in accordance with examples as described herein. In some implementations, aspects of the operations of 1006 may be performed by a device as described with reference to FIG. 1.

At 1008, the method may include enforcing access control security policies for services associated with the NF. The operations of 1008 may be performed in accordance with examples as described herein. In some implementations, aspects of the operations of 1008 may be performed by a device as described with reference to FIG. 1.

At 1010, the method may include storing a NF profile of the NF, the NF profile including the NF ID, the stored NF security state information associated with the NF, and trust evaluation information associated with the NF. The operations of 1010 may be performed in accordance with examples as described herein. In some implementations, aspects of the operations of 1010 may be performed by a device as described with reference to FIG. 1.

At 1012, the method may include transmitting a third signaling as allowed trust range values to a NF service producer to allow a NF service consumer with the allowed trust range values to consume the services associated with the NF. The operations of 1012 may be performed in accordance with examples as described herein. In some implementations, aspects of the operations of 1012 may be performed by a device as described with reference to FIG. 1.

At 1014, the method may include allocating the one or more allowed trust levels for the services associated with the NF based on established policy, NF trust information, and NF security data. The operations of 1014 may be performed in accordance with examples as described herein. In some implementations, aspects of the operations of 1014 may be performed by a device as described with reference to FIG. 1.

Figures 11, 12:
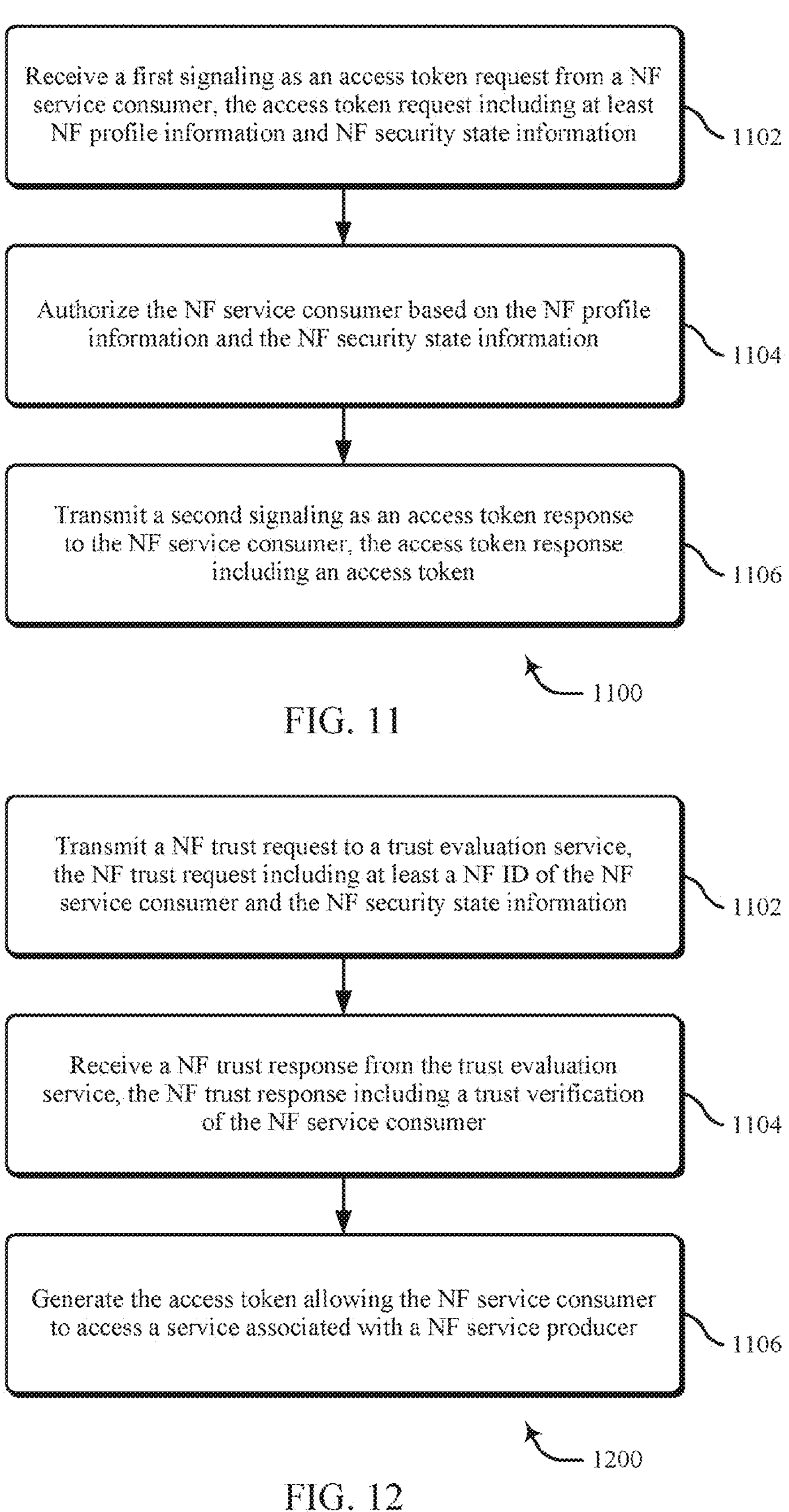

FIG. 11 illustrates a flowchart of a method 1100 that supports security management of trusted network functions in accordance with aspects of the present disclosure. The operations of the method 1100 may be implemented by a device or its components as described herein. For example, the operations of the method 1100 may be performed by a NRF as described with reference to FIGS. 1 through 8. In some implementations, the device may execute a set of instructions to control the function elements of the device to perform the described functions. Additionally, or alternatively, the device may perform aspects of the described functions using special-purpose hardware.

At 1102, the method may include receiving a first signaling as an access token request from a NF service consumer, the access token request including at least NF profile information and NF security state information. The operations of 1102 may be performed in accordance with examples as described herein. In some implementations, aspects of the operations of 1102 may be performed by a device as described with reference to FIG. 1.

At 1104, the method may include authorizing the NF service consumer based on the NF profile information and the NF security state information. The operations of 1104 may be performed in accordance with examples as described herein. In some implementations, aspects of the operations of 1104 may be performed by a device as described with reference to FIG. 1.

At 1106, the method may include transmitting a second signaling as an access token response to the NF service consumer, the access token response including an access token. The operations of 1106 may be performed in accordance with examples as described herein. In some implementations, aspects of the operations of 1106 may be performed by a device as described with reference to FIG. 1.

FIG. 12 illustrates a flowchart of a method 1200 that supports security management of trusted network functions in accordance with aspects of the present disclosure. The operations of the method 1200 may be implemented by a device or its components as described herein. For example, the operations of the method 1200 may be performed by a NRF as described with reference to FIGS. 1 through 8. In some implementations, the device may execute a set of instructions to control the function elements of the device to perform the described functions. Additionally, or alternatively, the device may perform aspects of the described functions using special-purpose hardware.

At 1202, the method may include transmitting a NF trust request to a trust evaluation service, the NF trust request including at least a NF ID of the NF service consumer and the NF security state information. The operations of 1202 may be performed in accordance with examples as described herein. In some implementations, aspects of the operations of 1202 may be performed by a device as described with reference to FIG. 1.

At 1204, the method may include receiving a NF trust response from the trust evaluation service, the NF trust response including a trust verification of the NF service consumer. The operations of 1204 may be performed in accordance with examples as described herein. In some implementations, aspects of the operations of 1204 may be performed by a device as described with reference to FIG. 1.

At 1206, the method may include generating the access token allowing the NF service consumer to access a service associated with a NF service producer. The operations of 1206 may be performed in accordance with examples as described herein. In some implementations, aspects of the operations of 1206 may be performed by a device as described with reference to FIG. 1.

Figure 13:
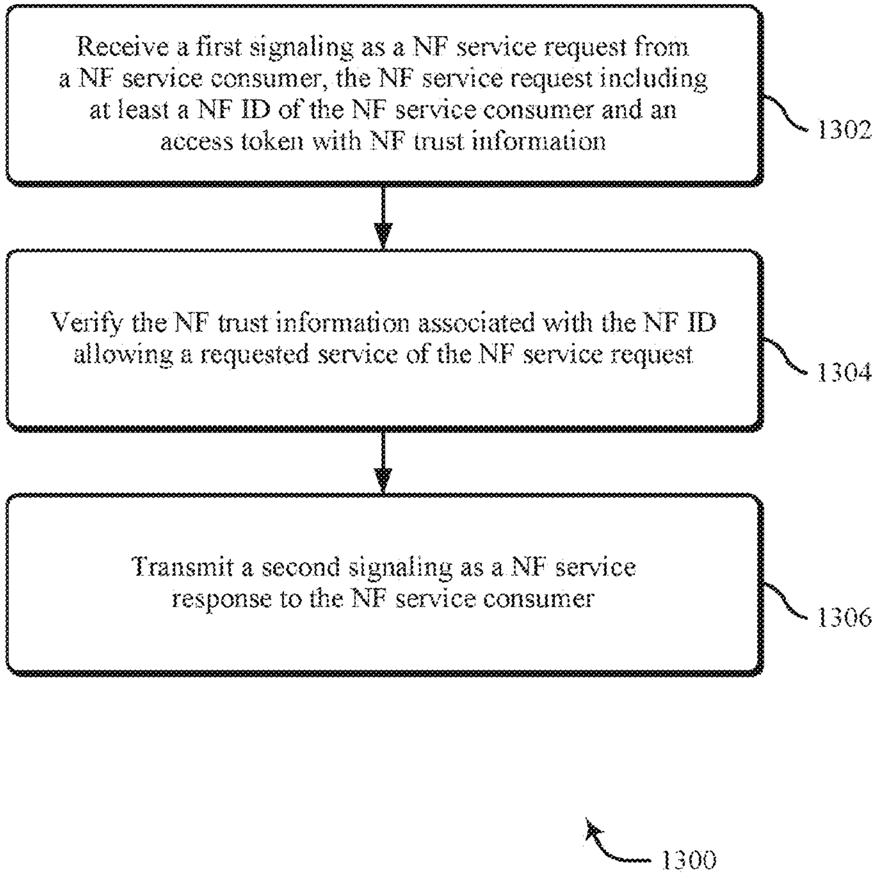

FIG. 13 illustrates a flowchart of a method 1300 that supports security management of trusted network functions in accordance with aspects of the present disclosure. The operations of the method 1300 may be implemented by a device or its components as described herein. For example, the operations of the method 1300 may be performed by a NF service producer and/or a NF service consumer as described with reference to FIGS. 1 through 8. In some implementations, the device may execute a set of instructions to control the function elements of the device to perform the described functions. Additionally, or alternatively, the device may perform aspects of the described functions using special-purpose hardware.

At 1302, the method may include receiving a first signaling as a NF service request from a NF service consumer, the NF service request including at least a NF ID of the NF service consumer and an access token with NF trust information. The operations of 1302 may be performed in accordance with examples as described herein. In some implementations, aspects of the operations of 1302 may be performed by a device as described with reference to FIG. 1.

At 1304, the method may include verifying the NF trust information associated with the NF ID allowing a requested service of the NF service request. The operations of 1304 may be performed in accordance with examples as described herein. In some implementations, aspects of the operations of 1304 may be performed by a device as described with reference to FIG. 1.

At 1306, the method may include transmitting a second signaling as a NF service response to the NF service consumer. The operations of 1306 may be performed in accordance with examples as described herein. In some implementations, aspects of the operations of 1306 may be performed by a device as described with reference to FIG. 1.

Figure 14:
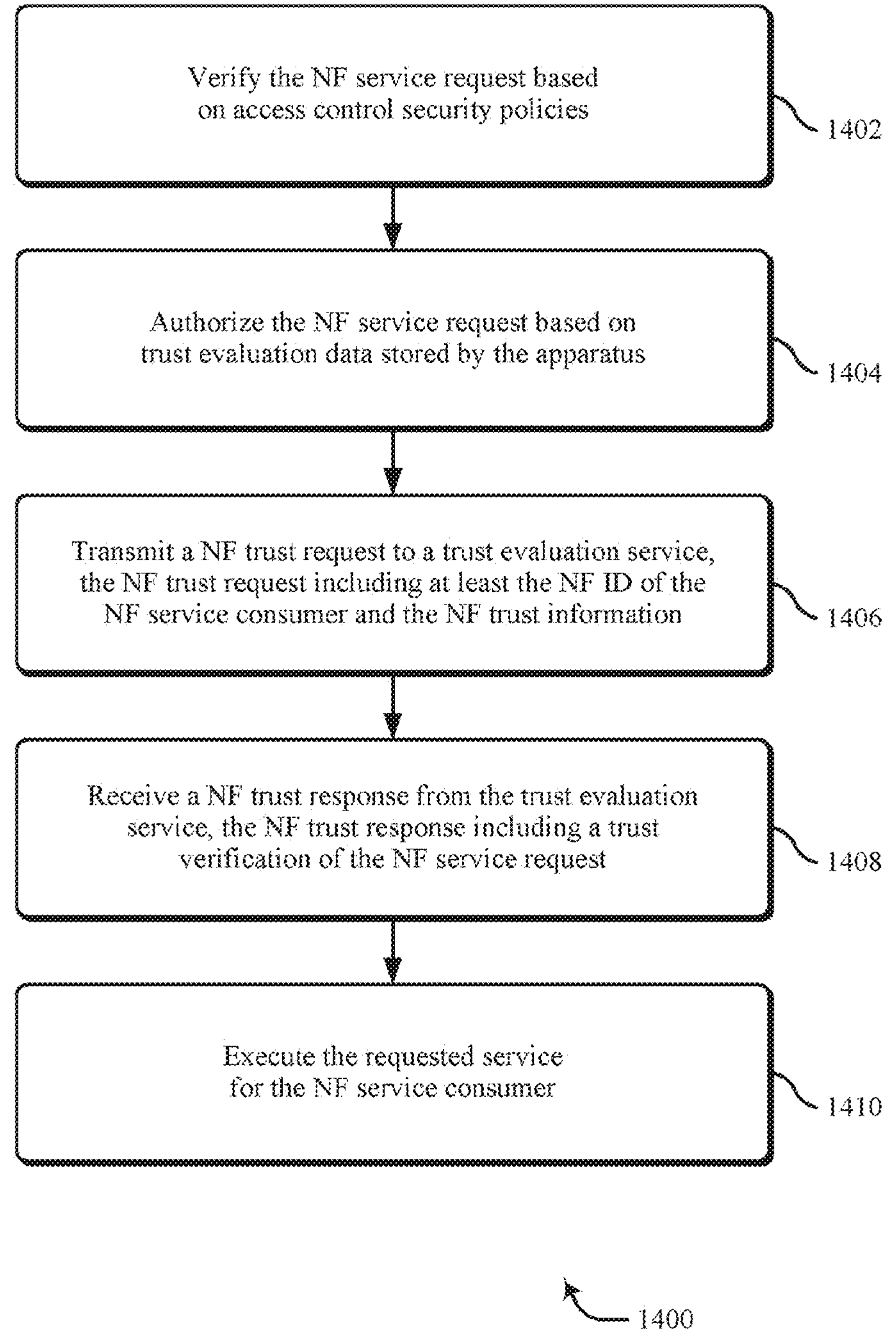

FIG. 14 illustrates a flowchart of a method 1400 that supports security management of trusted network functions in accordance with aspects of the present disclosure. The operations of the method 1400 may be implemented by a device or its components as described herein. For example, the operations of the method 1400 may be performed by a NF service producer and/or a NF service consumer as described with reference to FIGS. 1 through 8. In some implementations, the device may execute a set of instructions to control the function elements of the device to perform the described functions. Additionally, or alternatively, the device may perform aspects of the described functions using special-purpose hardware.

At 1402, the method may include verifying the NF service request based at least in part on access control security policies. The operations of 1402 may be performed in accordance with examples as described herein. In some implementations, aspects of the operations of 1402 may be performed by a device as described with reference to FIG. 1.

At 1404, the method may include authorizing the NF service request based on trust evaluation data stored by the apparatus. The operations of 1404 may be performed in accordance with examples as described herein. In some implementations, aspects of the operations of 1404 may be performed by a device as described with reference to FIG. 1.

At 1406, the method may include transmitting a NF trust request to a trust evaluation service, the NF trust request including at least the NF ID of the NF service consumer and the NF trust information. The operations of 1406 may be performed in accordance with examples as described herein. In some implementations, aspects of the operations of 1406 may be performed by a device as described with reference to FIG. 1.

At 1408, the method may include receiving a NF trust response from the trust evaluation service, the NF trust response including a trust verification of the NF service request. The operations of 1408 may be performed in accordance with examples as described herein. In some implementations, aspects of the operations of 1408 may be performed by a device as described with reference to FIG. 1.

At 1410, the method may include executing the requested service for the NF service consumer. The operations of 1410 may be performed in accordance with examples as described herein. In some implementations, aspects of the operations of 1410 may be performed by a device as described with reference to FIG. 1.

It should be noted that the methods described herein describe possible implementations, and that the operations and the steps may be rearranged or otherwise modified and that other implementations are possible. Further, aspects from two or more of the methods may be combined.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor.

Any connection may be properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of" or "one or both of") indicates an inclusive list such that, for example, a list of at least one of A, B, or C means A or B or C or AB or AC or BC or ABC (e.g., A and B and C). Similarly, a list of one or more of A, B, or C means A or B or C or AB or AC or BC or ABC (e.g., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on". Further, as used herein, including in the claims, a "set" may include one or more elements.

The terms "transmitting," "receiving," or "communicating," when referring to a network entity, may refer to any portion of a network entity (e.g., a base station, a CU, a DU, a RU) of a RAN communicating with another device (e.g., directly or via one or more other network entities).

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form to avoid obscuring the concepts of the described example.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication, comprising:

at least one memory; and at least one processor coupled with the at least one memory and configured to cause the apparatus to:

receive a first signaling as a network function (NF) request from a NF, the NF request including at least a NF type, a NF identifier (ID), NF security state information, and a message authentication code of the NF security state information;

verify a NF security state based at least in part on the NF ID and the NF security state information, wherein one of:

the NF is a NF service producer that verifies the message authentication code of the NF security state information with a private key or a shared secret key of the NF service producer; or the NF is a NF service consumer, and the message authentication code of the NF security state information is verified with one of a public key corresponding to a private key of the NF service consumer, or a shared secret key of the NF service consumer and the apparatus; and transmit a second signaling as a NF response, the NF response including a security verification of the NF request.

2. The apparatus of claim 1, wherein the at least one processor is configured to cause the apparatus to enforce access control security policies for services associated with the NF.

3. The apparatus of claim 2, wherein the at least one processor is configured to cause the apparatus to generate the access control security policies for the services associated with the NF.

4. The apparatus of claim 2, wherein the at least one processor is configured to cause the apparatus to generate the access control security policies based on at least one or more of an established policy, NF profile information, the NF security state information, or an allowed trust level for the services associated with the NF.

5. The apparatus of claim 2, wherein the at least one processor is configured to cause the apparatus to:

enforce the access control security policies based at least in part on allowed trust range values for the NF service consumer to consume the services associated with the NF; and transmit a third signaling as the allowed trust range values to the NF service producer to allow the NF service consumer with the allowed trust range values to consume the services associated with the NF.

6. The apparatus of claim 1, wherein:

the NF response includes one or more allowed trust levels for services associated with the NF; and the at least one processor is configured to cause the apparatus to allocate the one or more allowed trust levels for the services associated with the NF based at least in part on established policy, NF trust information, and NF security data.

7. The apparatus of claim 1, wherein the NF request includes a NF profile, the message authentication code, and an indication of a trust level for services associated with the NF, and the NF security state information is part of the NF profile.

8. The apparatus of claim 7, wherein the at least one processor is configured to cause the apparatus to verify the NF security state information by verifying the message authentication code of the NF security state information using the public key or the shared secret key.

9. The apparatus of claim 1, wherein the at least one processor is configured to cause the apparatus to:

verify the NF security state information by matching the NF ID or a NF instance ID corresponding to stored NF security state information associated with the NF; and store a NF profile of the NF, the NF profile including at least the NF ID, the stored NF security state information associated with the NF, and trust evaluation information associated with the NF.

10. The apparatus of claim 1, wherein access control security policies for services associated with the NF include an allowed trust level for services associated with the NF and at least one of a service provision restriction list, a service consumption restriction list, or a resource access restriction list.

11. The apparatus of claim 1, wherein at least one of:

the NF request is received as a NF registration request from the NF, and the NF response is transmitted as a NF registration response to the NF;

the NF request is received as a NF registration update request from the NF, and the NF response is transmitted as a NF registration update response to the NF; or the NF request is received as a NF discovery request from the NF, and the NF response is transmitted as a NF discovery response to the NF.

12. An apparatus for wireless communication, comprising:

at least one memory; and at least one processor coupled with the at least one memory and configured to cause the apparatus to:

receive a first signaling as an access token request from a network function (NF) service consumer, the access token request including at least NF profile information and NF security state information, wherein the access token request includes a message authentication code of the NF security state information;

authorize the NF service consumer based at least in part on the NF profile information and the NF security state information, wherein the authentication code of the NF security state information is verified with a public key corresponding to a private key of a NF service consumer or a shared secret key of the NF service consumer and the apparatus; and transmit a second signaling as an access token response to the NF service consumer, the access token response including an access token.

13. The apparatus of claim 12, wherein the at least one processor is configured to cause the apparatus to authorize the NF service consumer based at least in part on access control security policies.

14. The apparatus of claim 12, wherein the at least one processor is configured to cause the apparatus to authorize the NF service consumer based at least in part on trust evaluation data stored by the apparatus.

15. The apparatus of claim 12, wherein, to authorize the NF service consumer, the at least one processor is configured to cause the apparatus to:

transmit a NF trust request to a trust evaluation service, the NF trust request including at least a NF identifier (ID) of the NF service consumer and the NF security state information; and receive a NF trust response from the trust evaluation service, the NF trust response including a trust verification of the NF service consumer.

16. The apparatus of claim 12, wherein the at least one processor is configured to cause the apparatus to generate the access token allowing the NF service consumer to access a service associated with a NF service producer, the access token including NF trust information associated with the NF service consumer.

17. A processor for wireless communication, comprising:

at least one controller coupled with at least one memory and configured to cause the processor to:

receive a first signaling as a network function (NF) request from a NF, the NF request including at least a NF type, a NF identifier (ID), NF security state information, and a message authentication code of the NF security state information;

verify a NF security state based at least in part on the NF ID and the NF security state information, wherein one of:

the NF is a NF service producer that verifies the message authentication code of the NF security state information with a private key or a shared secret key of the NF service producer; or the NF is a NF service consumer, and the message authentication code of the NF security state information is verified with one of a public key corresponding to a private key of the NF service consumer, or a shared secret key of the NF service consumer; and transmit a second signaling as a NF response, the NF response including a security verification of the NF request.

18. The processor of claim 17, wherein the at least one controller is configured to cause the processor to enforce access control security policies for services associated with the NF.

19. A method performed by an apparatus, the method comprising:

receiving a first signaling as a network function (NF) request from a NF, the NF request including at least a NF type, a NF identifier (ID), NF security state information, and a message authentication code of the NF security state information;

verifying a NF security state based at least in part on the NF ID and the NF security state information, wherein one of:

the NF is a NF service producer that verifies the message authentication code of the NF security state information with a private key or a shared secret key of the NF service producer; or the NF is a NF service consumer, and the message authentication code of the NF security state information is verified with one of a public key corresponding to a private key of the NF service consumer, or a shared secret key of the NF service consumer and the apparatus; and transmitting a second signaling as a NF response, the NF response including a security verification of the NF request.

20. The method of claim 19, further comprising:

enforcing access control security policies for services associated with the NF.

* * * * *